United States Patent
Yamada et al.

(10) Patent No.: US 7,885,150 B2
(45) Date of Patent: Feb. 8, 2011

(54) TRACK JUMPING SCAN CONTROL DEVICE AND TRACK SEARCHING DEVICE

(75) Inventors: Shinichi Yamada, Osaka (JP); Kiyoshi Masaki, Hyogo (JP); Kazuhiko Miyazaki, Kyoto (JP)

(73) Assignee: Panasonic Corporation, Osaka (JP)

( * ) Notice: Subject to any disclaimer, the term of this patent is extended or adjusted under 35 U.S.C. 154(b) by 1121 days.

(21) Appl. No.: 11/598,822

(22) Filed: Nov. 14, 2006

(65) Prior Publication Data
US 2007/0115768 A1 May 24, 2007

(30) Foreign Application Priority Data
Nov. 14, 2005 (JP) .............................. 2005-328651

(51) Int. Cl.
*G11B 7/00* (2006.01)
(52) U.S. Cl. ................................. 369/44.28; 369/47.47
(58) Field of Classification Search .................. None
See application file for complete search history.

(56) References Cited

U.S. PATENT DOCUMENTS

| 5,566,141 | A | 10/1996 | Yamaguchi et al. |
| 5,793,722 | A | 8/1998 | Yamamuro |
| 6,240,055 | B1 | 5/2001 | Takamine et al. |
| 2002/0057630 | A1 | 5/2002 | Kishimoto et al. |
| 2005/0058038 | A1* | 3/2005 | Park et al. .................. 369/53.2 |
| 2005/0169139 | A1 | 8/2005 | Kakimoto et al. |

FOREIGN PATENT DOCUMENTS

| CN | 1365102 A | 8/2002 |
| JP | 07-296394 | 11/1995 |

OTHER PUBLICATIONS

The Notification of The First Office Action (in English) issued in Chinese Patent Application No. 200610145703.9, dated Apr. 27, 2010.

\* cited by examiner

*Primary Examiner*—Joseph Haley
(74) *Attorney, Agent, or Firm*—McDermott Will & Emery LLP

(57) ABSTRACT

In a track jumping scan control device wherein an optical beam is irradiated on an optical disc provided with a header region capable of a mark-recording operation with respect to both of land and groove tracks adjacent in a radial direction of the disc and comprising prepits, and a signal based on a reflected light resulting therefrom is used to make the optical beam jumping-scan with respect to a predetermined track, a full track jumping scan for making the optical beam track-jump between the land tracks or the groove tracks or a half track jumping scan for making the optical beam track-jump from the land track to the groove track or from the groove track to the land track is executed as the track jumping scan. Which of the two track jumping scans is executed is selected in accordance with a cycle at which the header region is set.

10 Claims, 20 Drawing Sheets

FIG. 19
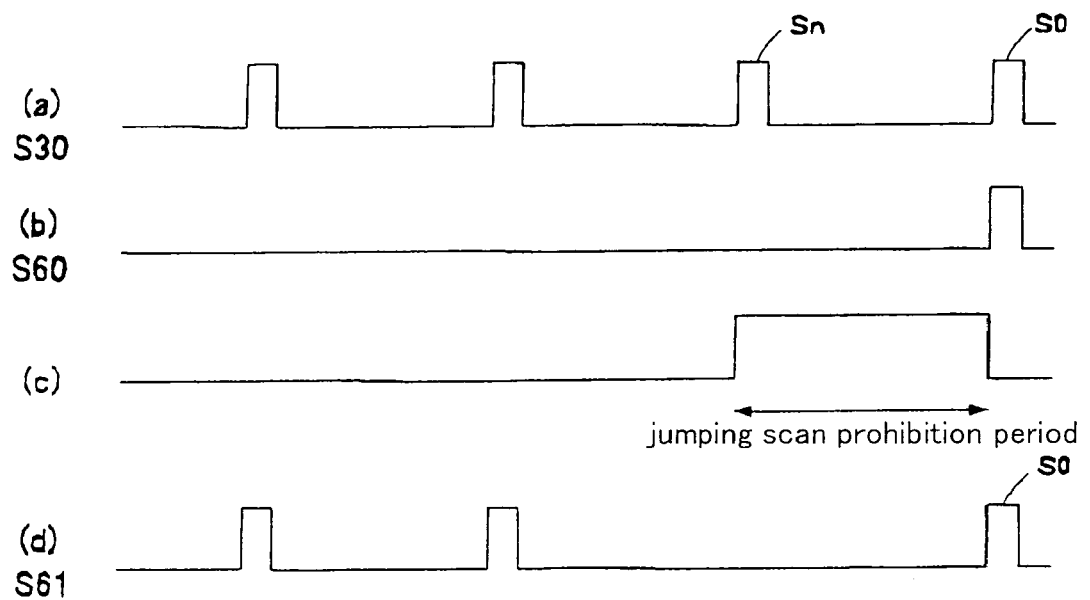
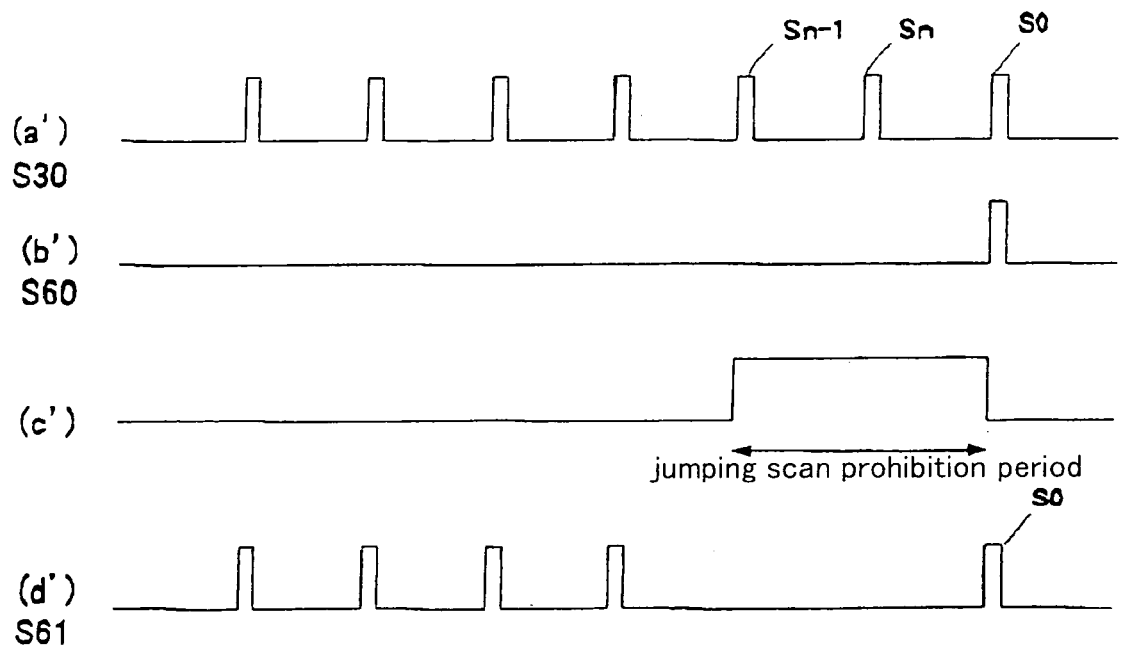

TRACK JUMPING SCAN CONTROL DEVICE AND TRACK SEARCHING DEVICE

BACKGROUND OF THE INVENTION

1. Field of the Invention

The present invention relates to a track jumping scan control device for controlling an optical beam track jumping scan and a track searching device for searching a track in an optical recording/reproducing apparatus for recording and reproducing information on an optical disc such as DVD-RAM in land track/groove track recording modes.

2. Description of the Related Art

In order to respond to a demand that a capacitance be increased which has been rising in recent years, high density optical disc formats of various types have been proposed. One of them is recited in No. H07-296394 of the Japanese Patent Applications Laid-Open. According to the format, a track in a circumferential direction is divided into a plurality of sectors, a header region having address information is provided at the top of each sector, and a recording region is provided subsequent to the header region. Further, the recording region comprises a land track having a protruding shape and a groove track having a recessed shape, polarities of which for tracking control are inverted, and these tracks are alternately provided in a radial direction. The address information of the header region is called CAPA (Complementary Allocated Pit Address) and comprises pits previously formed between the land track and the groove track (prepits). The pits thus constitute the address information so that an optical head can extract the address information in both the groove and land tracks.

In an optical recording/reproducing apparatus for recording and reproducing information on the optical disc, a focus control in which an optical beam is constantly in a predetermined focused state on a material film and a tracking control in which the optical beam can constantly and accurately scan a predetermined track are executed. Further, a track jumping scan in which the optical beam jumps from one track to another is executed when it is necessary for the optical beam to transfer from an arbitrary track to another. The track jumping scan is described referring to FIG. 20.

FIG. 20 is a timing chart of signals for executing the track jumping scan. In FIG. 20, the tracking control is OFF at timings t51-t53, and the tracking control is ON at and after the timing t53. (a) denotes a CAPA signal in the header region, (b) denotes a tracking error signal, (c) denotes a zero-crossing detecting signal for detecting zero-crossing of the tracking error signal, (d) denotes a tracking drive signal including an acceleration drive pulse for accelerating the optical beam toward an adjacent track and a deceleration drive pulse for decelerating the optical beam.

As shown in (a), the CAPA signal rises at a timing t50, and at the same time, the tracking error signal crosses the zero level as shown in (b). Then, the zero-crossing detecting signal rises as shown in (c). As shown in (d), at the timing t51 after a predetermined time has passed since the rise of the zero-crossing detecting signal, the optical beam is moved toward a targeted track at an increasing speed by the acceleration drive pulse having a rectangular shape. After the acceleration drive pulse is terminated, the optical beam is moved by inertia. At a time point when the optical beam falls on a substantially intermediate point between the targeted track and another track adjacent thereto in the radial direction of the disc, that is the timing t52 in (d), the optical beam is decelerated by the deceleration drive pulse having the same rectangular shape as that of the acceleration drive pulse but an inversed polarity. At and after the timing t53 when the deceleration drive pulse is terminated, the tracking control is ON, however, the tracking control is destabilized between the timings t53 and t55 since disturbances are generated in the drive signal under the influence of the CAPA signal in (a) at timings t54-t55 as shown in a waveform of the drive signal in (d). Immediately after the tracking control is operated again at and after the timing t53, the control is in a transient state and large errors are generated in the control operation, which makes it impossible for the optical beam to be stably drawn into the targeted track when the disturbances in the header region are superposed.

SUMMARY OF THE INVENTION

Therefore, a main object of the present invention is to speedily stabilize tracking control by completing a jumping scan with respect to a targeted track before an optical beam enters a header region to thereby draw the optical beam into the targeted track.

In order to achieve the foregoing object, a track jumping scan control device according to the present invention is a track jumping scan control device wherein a signal based on a reflected light of an optical beam irradiated on an optical disc provided with a header region having an address information, and land tracks and groove tracks in a recording region subsequent to the header region alternately in a radial direction of the optical disc is used to make the optical beam jump-scan a predetermined track, the track jumping scan control device executing, as the track jumping scan:

a full track jumping scan for making the optical beam track-jump between the land tracks or the groove tracks; and a half track jumping scan for making the optical beam track-jump from the land track to the groove track or from the groove track to the land track, and the track jumping scan control device further selecting which of the two track jumping scans is executed in accordance with a cycle at which the header region is set. The address information preferably comprises CAPA.

According to the present invention, in the case where the optical beam executes the track jumping scan to the targeted track, not the full track jumping scan but the half track jumping scan can be selected if the cycle at which the header region is set is short. Thereby, the track jumping scan can be stably terminated before the optical beam reaches the header region. As a result, the tracking control can be realized in such a manner that any influence from the header region is alleviated.

When the cycle at which the header region is set is below a reference cycle, only the half track jumping scan is preferably selected. When the cycle at which the header region is set is at least the reference cycle, the full track jumping scan and the half track jumping scan are preferably mixedly selected. When the number of the tracks subjected to the track jumping scan is an even number, oily the full track jumping scan is preferably selected. When the number of the tracks subjected to the track jumping scan is an odd number, the full track jumping scan and the half track jumping scan are preferably mixedly selected.

Further, the cycle at which the header region is set in an arbitrary zone in the radial direction of the optical disc is preferably calculated based on the number of the header regions formed on the track equal to one lap of the arbitrary zone and number of rotations of the optical disc. Accordingly, the cycle at which the header region is set can be appropriately set even if the number of rotations of the optical disc is large. As a result, the full track jumping scan can be stabilized without any influence from the header region.

Further, in the case where the optical disc is divided into a plurality of radial zones and the number of the header regions formed in one lap of each zone is constant, the number of the header regions formed in one lap of the zone on which the optical beam falls with respect to the optical disc is preferably calculated. Accordingly, in the case where the optical disc is divided into the plurality of radial zones and the number of the header regions formed in one lap of each zone is constant, the number of the header regions can be calculated based on the zone on which the optical beam falls with respect to the optical disc, and the cycle of the header region in the arbitrary zone in the radial direction of the optical disc can be calculated from the calculated number of the header regions. As a result, the full track jumping scan can be stabilized without any influence from the header region.

The track jumping scan control device preferably further comprises a mover for moving the optical beam in the radial direction of the optical disc, wherein the zone on which the optical beam falls is calculated based on a position of the mover. The track jumping scan control device preferably further comprises a rotation control system for controlling a targeted number of rotations of the optical disc, wherein the number of rotations of the optical disc is calculated based on a responsiveness of the rotation control system when the optical beam is moved in the radial direction of the optical disc in the case where the targeted number of the rotations is different at each position in the radial direction of the optical disc.

According to the present invention, the influence from the header region can be alleviated in the track jumping scan, and the optical beam track jumping scan can be thereby stabilized.

BRIEF DESCRIPTION OF THE DRAWINGS

These and other objects as well as advantages of the invention will become clear by the following description of preferred embodiments of the invention. A number of benefits not recited in this specification will come to the attention of the skilled in the art upon the implementation of the present invention.

FIG. 19 is a timing chart of the signals of the respective parts in FIG. 17.

DETAILED DESCRIPTION OF THE INVENTION

Hereinafter, preferred embodiments of a track searching device and a track jumping scan control device installed in the track searching device according to the present invention are described referring to the accompanied drawings

Preferred Embodiment 1

Figure 1:
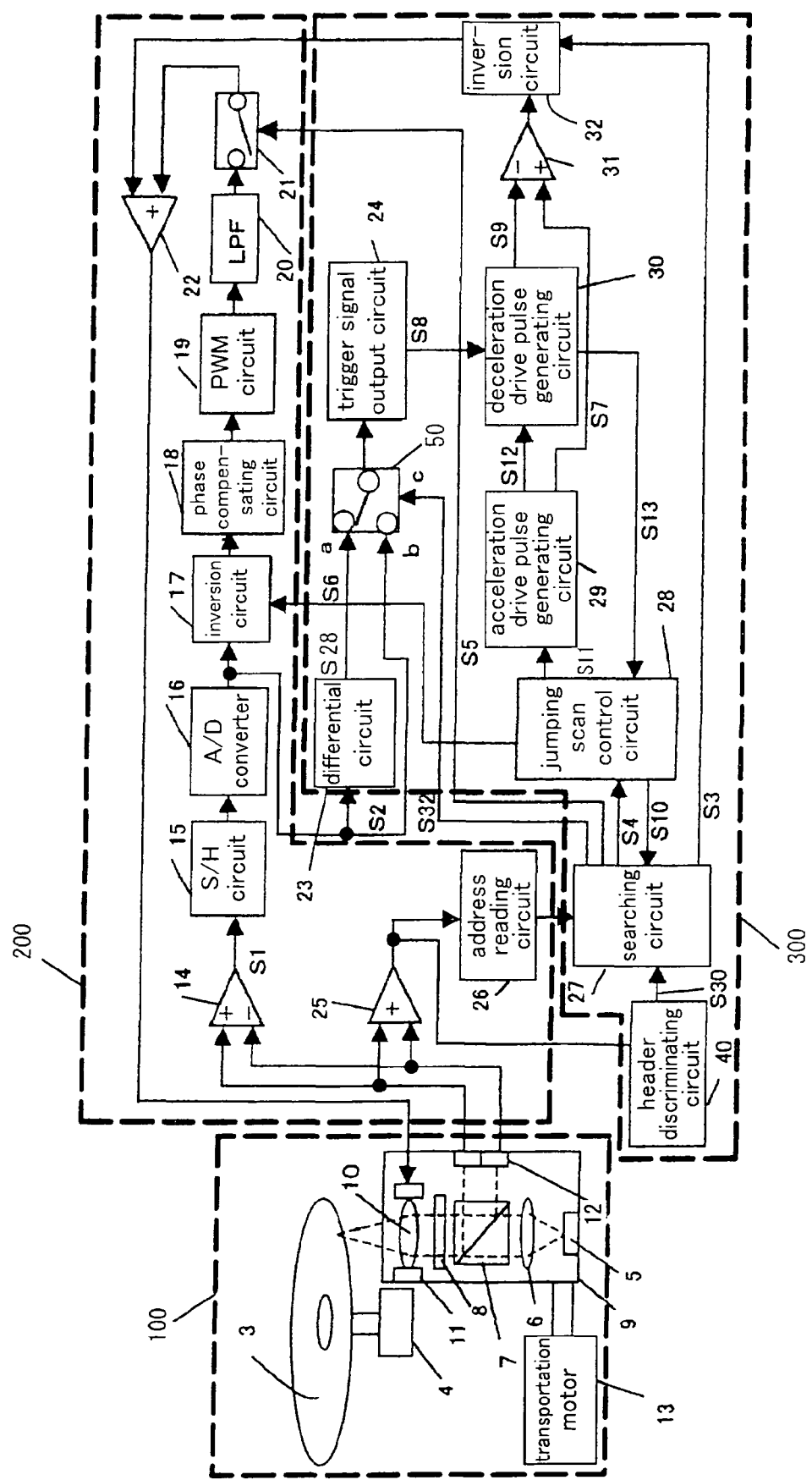
FIG. 1 is a block diagram illustrating a constitution of a track searching device according to a preferred embodiment 1 of the present invention.

FIG. 1 is a block diagram illustrating a constitution of a track searching device according to a preferred embodiment 1 of the present invention. In the track searching device, components can be divided into three blocks. More specifically, the track searching device comprises a disc/head block 100 for irradiating an optical beam on a disc and receiving a light from the disc, a tracking control block 200 comprising a circuit for realizing tracking control by digital control and a circuit for reading an address, and a track jumping scan block 300 for executing a track jumping scan in one track. A part of the track jumping scan block 300 constitutes the track jumping scan control device in the track searching device.

Constitutions and operations of the respective blocks 100, 200 and 300 are individually described.

Disc/Head Block 100

The disc/head block 100 comprises an optical disc 3 which is an information recording medium, a disc motor 4 comprising, for example, a spindle motor for rotating the optical disc 3, an optical head 9 for irradiating the optical beam on the optical disc 3, and a transportation motor 13 which is an example of a transporter for moving the optical head 9. The optical head 9 can constitute a mover for moving the optical beam in a radial direction of the optical disc, and a zone on which the optical beam falls can be calculated from a position of the optical head 9.

The optical head 9 comprises a light source 5 such as a semiconductor laser, a coupling lens 6 into which an optical beam generated from the light source 5 sequentially enters, a polarization beam splitter 7, a ¼ wavelength plate 8, a convergence lens 10, a tracking actuator 11, and a divided-region light detector 12 into which the light beam from the disc 3 enters. The optical head 9 does not necessarily comprise these components, and the constitution described above is only an example.

The tracking actuator 11 comprises a movable unit having, for example, a tracking coil, and a fixed unit having a permanent magnet. The convergence lens 10 is attached to the movable unit of the tracking actuator 11. The divided-region light detector 12 has two divided light receiving regions, and a direction of a dividing line of the light receiving regions corresponds to a track direction on a light receiving surface.

The operation of the disc/head block 100 is described. The disc 3 is rotated at a predetermined number of rotations (rotational speed) by the disc motor 4. The optical beam generated by the light source 5 is converted into a parallel light in the coupling lens 6, and the parallel light transmits through the polarization beam splitter 7, and then, the ¼ wavelength plate 8. The transmitted parallel light is converged on the disc 3 by the convergence lens 10 and then irradiated. The convergence lens 10 is an example of a converging unit for converging the optical beam on the optical disc 3.

The reflected light of the optical beam irradiated on the disc 3 transmits through the convergence lens 10, and then, the ¼ wavelength plate 8, and reflected on the polarization beam splitter 7 and irradiated on the divided-region light detector 12. The two light receiving regions of the divided-region light detector 12 respectively convert the irradiated light into electrical signals, and output the electrical signals to the tracking control block 200.

A position at which the optical beam is irradiated on the optical disc 3 can be adjusted by the transportation motor 13 and the tracking actuator 11. The transportation motor 13 moves the whole optical head 9 in the radial direction of the optical disc 3. The tracking actuator 11 changes a position of the fixed unit relative to the permanent magnet by utilizing an electric magnetic force generated in response to a current flowing in the coil of the movable unit to thereby move the optical beam in the radial direction of the disc 3, that is a direction traversing the track. The transportation motor 13 is used when the whole optical head 9 is transported in the radial direction of the disc. The tracking actuator 11 is used when the optical beam is moved per track. The tracking actuator 11 constitutes a mover for moving the optical beam to a predetermined track by moving the convergence lens 10 which is an example of the convergence unit for converging the optical beam, however, the moving unit is not necessarily limited to the tracking actuator 11.

Tracking Control Block 200

The tracking control block 200 comprises a circuit for the tracking control and a circuit for reading the address. The circuit for the tracking control comprises a differential circuit 14, sample/hold (S/H) circuit 15, an A/D converter 16, a tracking polarity inverting circuit 17, a phase compensating circuit 18, a pulse width modulating (PWM) circuit 19, a low-pass filter (LPF) 20, and a tracking control ON/OFF switch 21.

Figure 2:
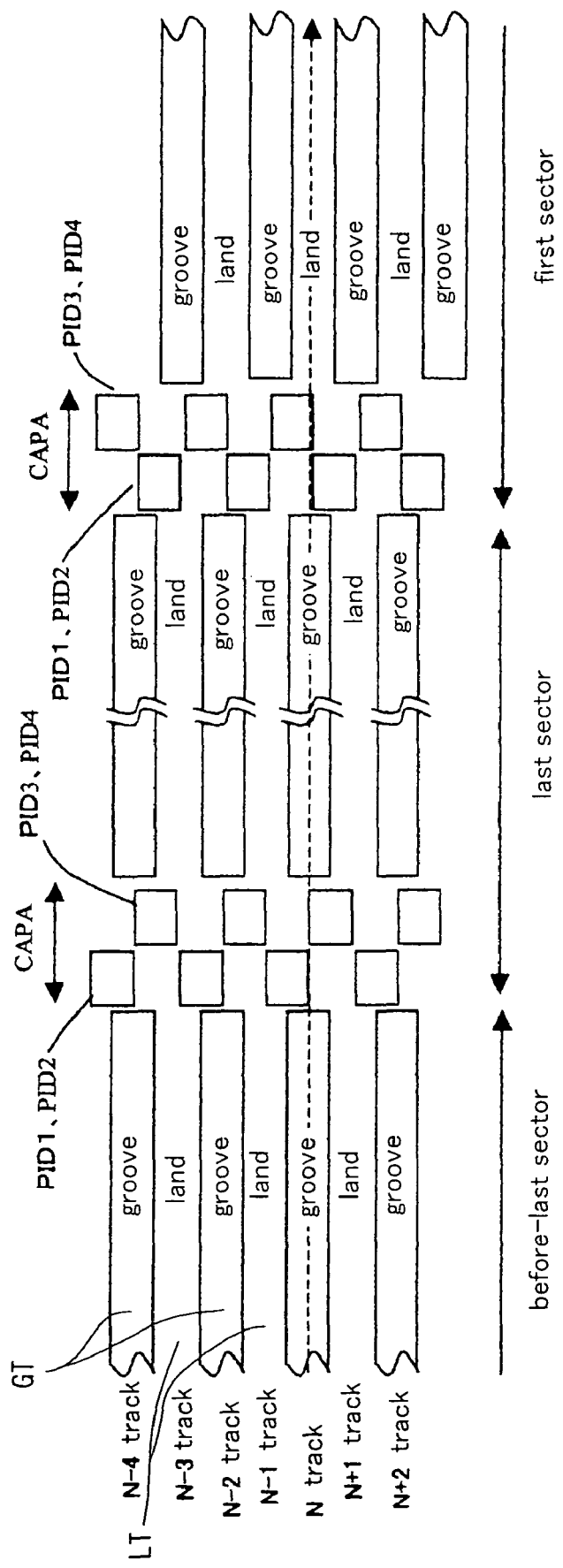
FIG. 2 is a plan view illustrating a structure of tracks of an optical disc.

The output signals corresponding to the two light receiving regions of the divided-region light detector 12 are inputted to an inversion terminal and a non-inversion terminal of the differential circuit 14. The differential circuit 14 thus constituted and the optical disc 3 whose structure is shown in FIG. 2 are used so that a tracking error signal S1 is detected by means of the push-pull method. The divided-region light detector 12 and the differential circuit 14 are examples of a tracking error detector for generating the tracking error signal S1 based on the reflected light from the optical disc 3. As described earlier, the tracking actuator 11 constitutes the mover for moving the optical beam to the predetermined track by moving the convergence lens 10 which is the optical beam converging unit. The mover is controlled by a controller so that the optical beam is moved to the predetermined track in accordance with the tracking error S1. All or a part of the tracking control block 200 can constitute the controller.

The optical disc 3 is divided into a plurality of zones from an inner peripheral side through an outer peripheral side thereof in a concentric or spiral shape with respect to the center of the disc, and each zone has a multiplicity of tracks. The tracks are a groove track GT and a land track LT alternately arranged in the radial direction of the disc as shown in FIG. 2. The tracks are divided into a plurality of circumferential sectors, and each sector has a header region at the top thereof and a recording region subsequent thereto (groove track and land track). In the header region, address information, which is called CAPA (Complementary Allocated Pit Address) comprising prepits, is previously formed per sector (physical sector). The CAPA is formed between the land track and the groove track along the radial direction of the disc so that the optical head can extract the address information in either of the groove and land tracks. The CAPA, whose details are omitted, has a first header PID1, a second header PID2, a third header PID3 and a fourth header PID4. In FIG. 2, a before-last sector, a last sector and a first sector are shown as typical examples, and N+2-N-4 tracks are shown in each sector. Of the plurality of sectors, the before-last sector, last sector and first sector are particularly shown in FIG. 2 in order to show that a polarity of the tracking control is switched to and from the land track LT and the groove track GT in an inverse manner in one rotation of the optical disc 3.

The description is given below referring to FIG. 1 again. The tracking error signal S1 outputted by the differential circuit 14, which is an analog signal, is converted into a digital signal in the A/D converter 16 via the sample/hold circuit 15. The sample/hold circuit 15 is a circuit for discretely sampling the tracking error signal S1 outputted from the differential circuit 14 and holding the sampled signal during a time period required for the A/D conversion by the A/D converter 16. In the tracking error signal S1, which was converted into the digital signal by the A/D converter 16, the polarity of the tracking control is inverted by the tracking polarity inverting circuit 17. The output signal from the A/D converter 16 is also outputted to the track jumping scan block 300. The tracking error signal S1 whose polarity is inverted by the inverting circuit 17 is inputted to the phase compensating circuit 18. The phase compensating circuit 18, though details are omitted, assures the stability of the control operation by the tracking control system. The output signal from the phase compensating circuit 18 is inputted to the PWM circuit 19. The PWM circuit 19 outputs a signal whose pulse width was modulated in accordance with the digital signal output from the phase compensating circuit 16. A cycle of the output is equal to a cycle of the A/D conversion by the A/D converter 16. The output signal of the PWM circuit 19 is inputted to the low-pass filter 20. The low-pass filter 20 converts the signal whose pulse width was modulated from the PWM circuit 19 into the analog signal, and a cut-off frequency F1 thereof is set so that F1<1/T1 is satisfied with respect to a conversion cycle T1 of the A/D converter 16.

An output terminal of the low-pass filter 20 is connected to the tracking control ON/OFF switch 21. The tracking control ON/OFF switch 21 switches ON (operation) and OFF (non-operation) of the tracking control. In a state where the tracking control ON/OFF switch 21 is closed (ON state of the tracking control), the output signal of the low-pass filter 20 is added to the tracking actuator 11 as the tracking drive signal via an adding circuit 22. Therefore, in the state where the tracking control ON/OFF switch 21 is closed, the optical beam is controlled to constantly fall on the substantial center of the track in the radial width thereof (track width).

The circuit for reading the address includes an adding circuit 25 and an address reading circuit 26. The output signals corresponding to the two light receiving regions of the divided-region light detector 12 are also inputted to the adding circuit 25. The adding circuit 25 detects and outputs a summed amount of the reflected light from the optical disc 3. The address reading circuit 26 reads the address information provided in each track of the optical disc 3 from the output signal of the adding circuit 25, and outputs an address signal thereby obtained to a searching circuit 27 of the track jumping scan block 300.

Track Jumping Scan Block 300

The track jumping scan block 300 comprises a header discriminating circuit 40, a searching circuit 27, a jumping scan control circuit 28, an acceleration drive pulse generating circuit 29, a deceleration drive pulse generating circuit 30, a differential circuit 23, a half track jumping scan/full track jumping scan selecting switch 50, a trigger signal output circuit 24, a differential circuit 31, and a jumping direction inverting circuit 32. All or a part of the track jumping scan block 300 constitutes a drive signal generator. The drive signal generator generates and outputs the tracking drive signal for moving the optical beam to the predetermined track based on the reflected light of the optical beam irradiated on the optical disc 3.

The header discriminating circuit 40 reads the address information provided in each track of the optical disc 3 from the output signal of the adding circuit 25, and then, discriminates the header region and outputs a header signal S30 thereby obtained to the searching circuit 27.

The searching circuit 27, as described later, constitutes a track selector for selecting which of the full track jumping scan and the half track jumping scan is executed, in accordance with a cycle at which the header region is set (hereinafter, referred to as header cycle). Describing the full track jumping scan, the optical beam is jumping-scanned from the land track to the land track or from the groove track to the groove track in accordance with the header cycle. Describing the half track jumping scan, the optical beam is jumping-scanned from the land track to the groove track or from the groove track to the land track. The selection of the track jumping scan means that one of the full track jumping scan and the half track jumping scan is selected in accordance with the header cycle.

When the address of the track as the search target is inputted from an external device not shown, for example, a microcomputer, the searching circuit 27 selects the track jumping scan in accordance with the input from the address reading circuit 26. The selection is repeated every time when one track is subjected to the track jumping scan until the optical beam reaches the targeted track.

The searching circuit 27 outputs a jumping instruction signal S4 to the jumping scan control circuit 28, outputs a half track jumping scan/full track jumping scan switching signal S32 to the half track jumping scan/full track jumping scan selecting switch 50, outputs a tracking control ON/OFF switching signal S5 to the tracking control ON/OFF selecting switch 21, and outputs a jumping direction signal S3 to the jumping direction inverting circuit 32.

The output signal of the A/D converter 16 is inputted to the trigger signal output circuit 24 from the half track jumping scan/full track jumping scan selecting switch 50. The output signal of the A/D converter 16 is inputted to the trigger signal output circuit 24 directly or via the differential circuit 23. The trigger signal output circuit 24 detects the zero-crossing or an extreme value of the inputted signal to thereby generate a trigger signal S8 and outputs the generated trigger signal S8 to the deceleration drive pulse generating circuit 30.

The jumping instruction signal S4 is inputted from the searching circuit 27 to the jumping scan control circuit 28. The jumping scan control circuit 28 receives the jumping instruction signal S4 and correspondingly outputs a necessary instruction signal S11 to thereby make the track jumping scan be executed to an adjacent track, and outputs a jumping termination signal S10 to the searching circuit 27 after the scan is completed.

The instruction signal S11 for starting the acceleration of the optical beam is outputted from the jumping scan control circuit 28 to the acceleration drive pulse generating circuit 29, and land track/groove track switching (tracking polarity) signal S6 is outputted from the jumping scan control circuit 28 to the tracking polarity inverting circuit 17 of the tracking control block 200.

The acceleration drive pulse generating circuit 29 outputs an acceleration drive pulse S7 for accelerating the optical beam to the non-inversion terminal of the differential circuit 31. The deceleration drive pulse generating circuit 30 outputs a deceleration drive pulse S9 for decelerating the optical beam to the inversion terminal of the differential circuit 31. The output of the differential circuit 31 is inputted to the tracking actuator 11 via the jumping direction inverting circuit 32 and the adding circuit 22. The output of the differential circuit 31 functions as the tracking drive signal for the tracking actuator 11. The acceleration drive pulse generating circuit 29 outputs an acceleration termination signal S12 to the deceleration drive pulse generating circuit 30. The deceleration drive pulse generating circuit 30 outputs a deceleration termination signal S13 to the jumping scan control circuit 28.

Referring to FIGS. 3 through 12, the optical beam track jumping scan in the track searching device thus constituted is described in detail. The preferred embodiment 1 is described based on an example of the track jumping scan by the optical beam from the inner peripheral side to the outer peripheral side of the optical disc 3. It is needles to say that the present invention can be implemented in the case of the track jumping scan in a direction reverse to that of the foregoing example not only in the present preferred embodiment but also in other preferred embodiments.

In the track jumping scan in the description below, a half track jumping scan mode is selected when the header cycle is below a reference cycle, while a full track jumping scan mode is selected when the header cycle is at least the reference cycle. The modes are selected by the searching circuit 27.

The header cycle denotes a cycle at which the header region is set, in other words, a difference between a timing by which the header region of a sector has reached a position in accordance with the rotation of the optical disc and a timing by which the header region of a subsequent sector has reached the same position. Therefore, the header cycle changes depending on the number of rotations of the optical disc or the zone where the header region is placed. The reference cycle is a header cycle used as a reference to decide which of the half track jumping scan mode and the full track jumping scan mode is selected.

Figure 3:
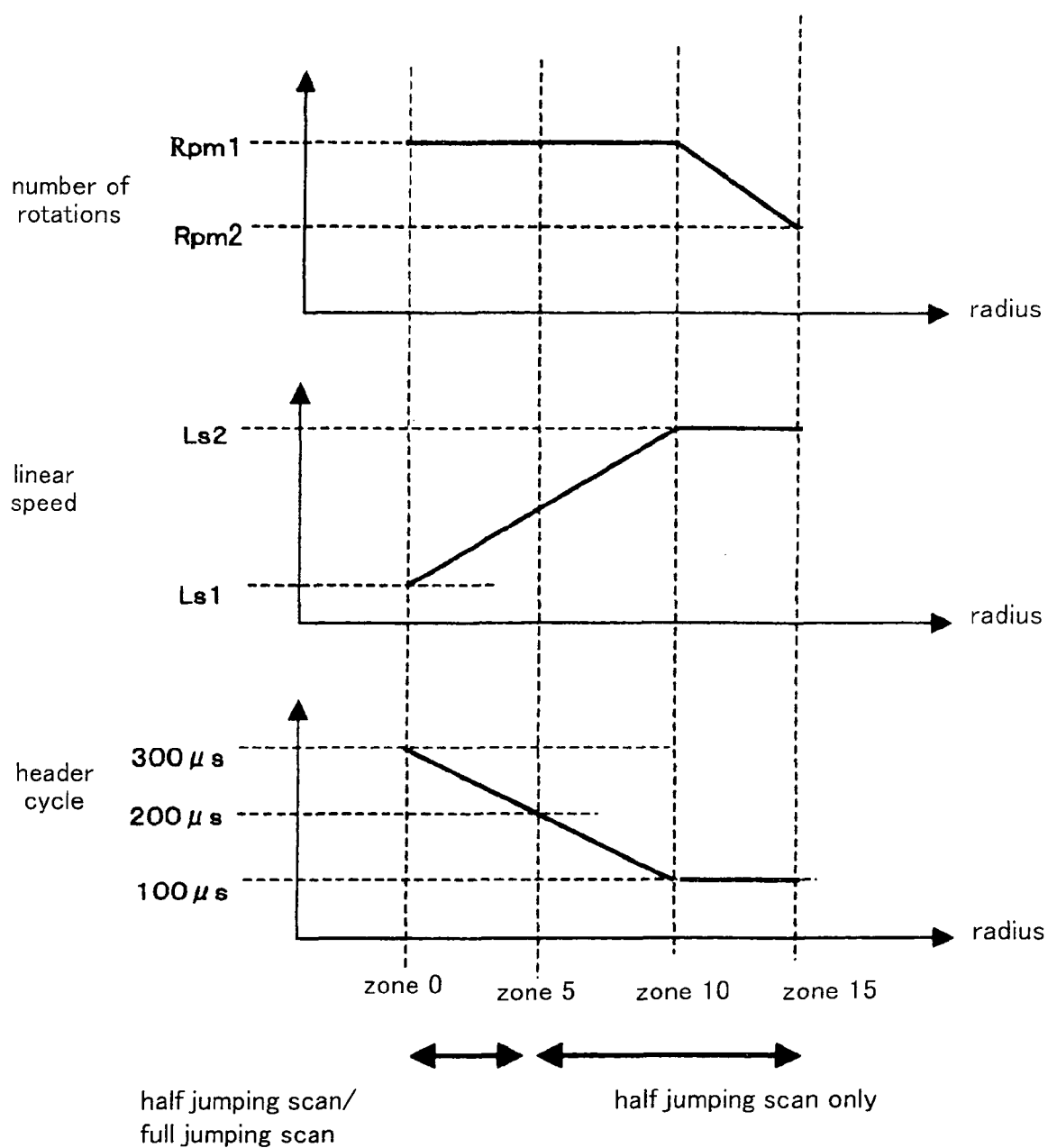
FIG. 3 shows a relationship among number of rotations, a lineal speed and a header cycle of the optical disc with respect to zones.

The searching circuit 27 generates the reference cycle, while memorizing the header cycle per zone shown in a table (header cycle table). The searching circuit 27 compares the memorized header cycle to the reference cycle, then, as a result of the comparison, selects the half track jumping scan mode when the header cycle is below the reference cycle, and selects the full track jumping scan mode or a scan mode in which the half track jumping scan and the full track jumping scan are mixedly present when the header cycle is at least the reference cycle. FIG. 3 shows the track jumping scan modes according to the present preferred embodiment.

The header cycle is described referring to FIG. 3. The number of rotations (r.p.m.) of the optical disc 3 in each zone is shown at an upper part of FIG. 3, a linear speed of the optical disc 3 in each zone is shown at a middle part of FIG. 3, and the header cycle (μs) in each zone is shown at a lower part of FIG. 3. The rotation of the optical disc 3 is controlled to retain a constant number of rotations (CAV control) in a first zone region from a zone 0 on the inner peripheral side to, for example, a zone 10 on the outer peripheral side. The rotation of the optical disc 3 is controlled so that the number of rotations is gradually decreased (CLV control) from the inner periphery to the outer periphery in a second zone region including the zone 10 to zones thereafter. The rotation control can be referred to as PCAV (Partial Constant Angular Velocity) control because the CAV control is partly adopted. According to the rotation control, the linear speed is increased from the inner periphery to the outer periphery in the first zone region, and remains constant in the second zone region. The header cycle is gradually reduced from the inner peripheral side to the outer peripheral side in the first zone region, and maintains a constant length in any zone in the second zone region.

In the case where a header cycle 200 μs of the zone 5 shown in FIG. 3 is set to, for example, the reference cycle in the searching circuit 27, the track jumping scan mode satisfying the following conditions is selected:

The header cycle 200 μs is used as the reference cycle;
Any zone region having the header cycle at least the reference cycle is regarded as the zone region where the half track jumping scan mode and the full track jumping scan mode are mixedly present; and
Any zone region having the header cycle below the reference cycle is regarded as the zone region where only the half track jumping scan mode is adopted.

The header cycle can be calculated based on the number of the header regions and the number of rotations of the optical disc on the track where the optical beam falls. Further, the header cycle can be calculated in such a manner that the number of the header regions formed in one lap of the optical disc is obtained based on the zone where the optical beam falls on with respect to the optical disc when the number of the header regions formed in one lap of the zone is constant.

Figure 4:
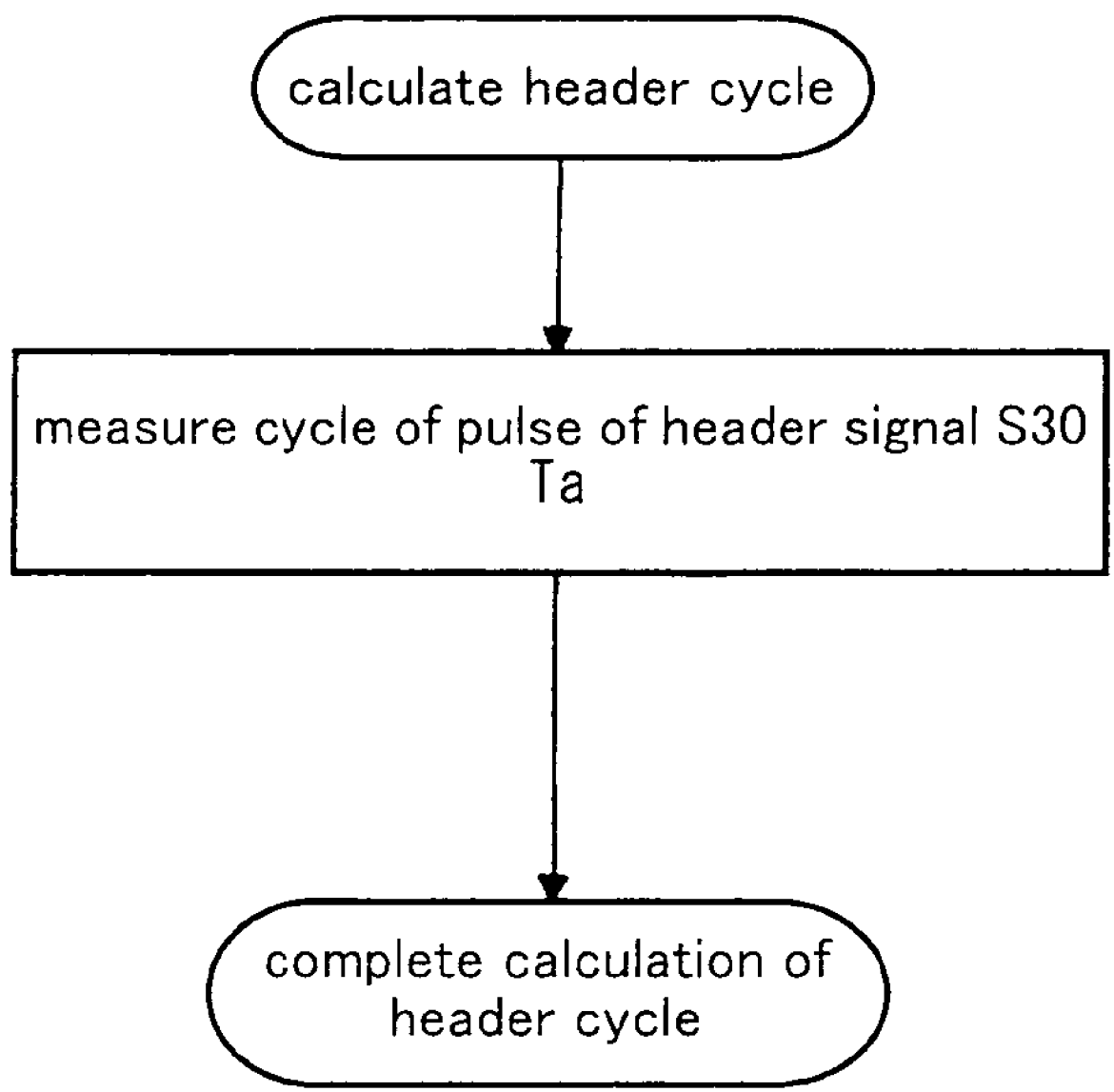
FIG. 4 is a flow chart of a method of calculating the header cycle.

The header region may be memorized in the form of the table, or may be actually measured as a header cycle Ta based on a header signal (signal including information on zone position, number of rotations of the optical disc, number of the header regions) as shown in a flow chart of FIG. 4. More specifically, the header cycle Ta can be actually measured in such a manner that a cycle of the pulse corresponding to the header region of the header signal S30 outputted from the header discriminating circuit 40 is measured.

Figure 5:
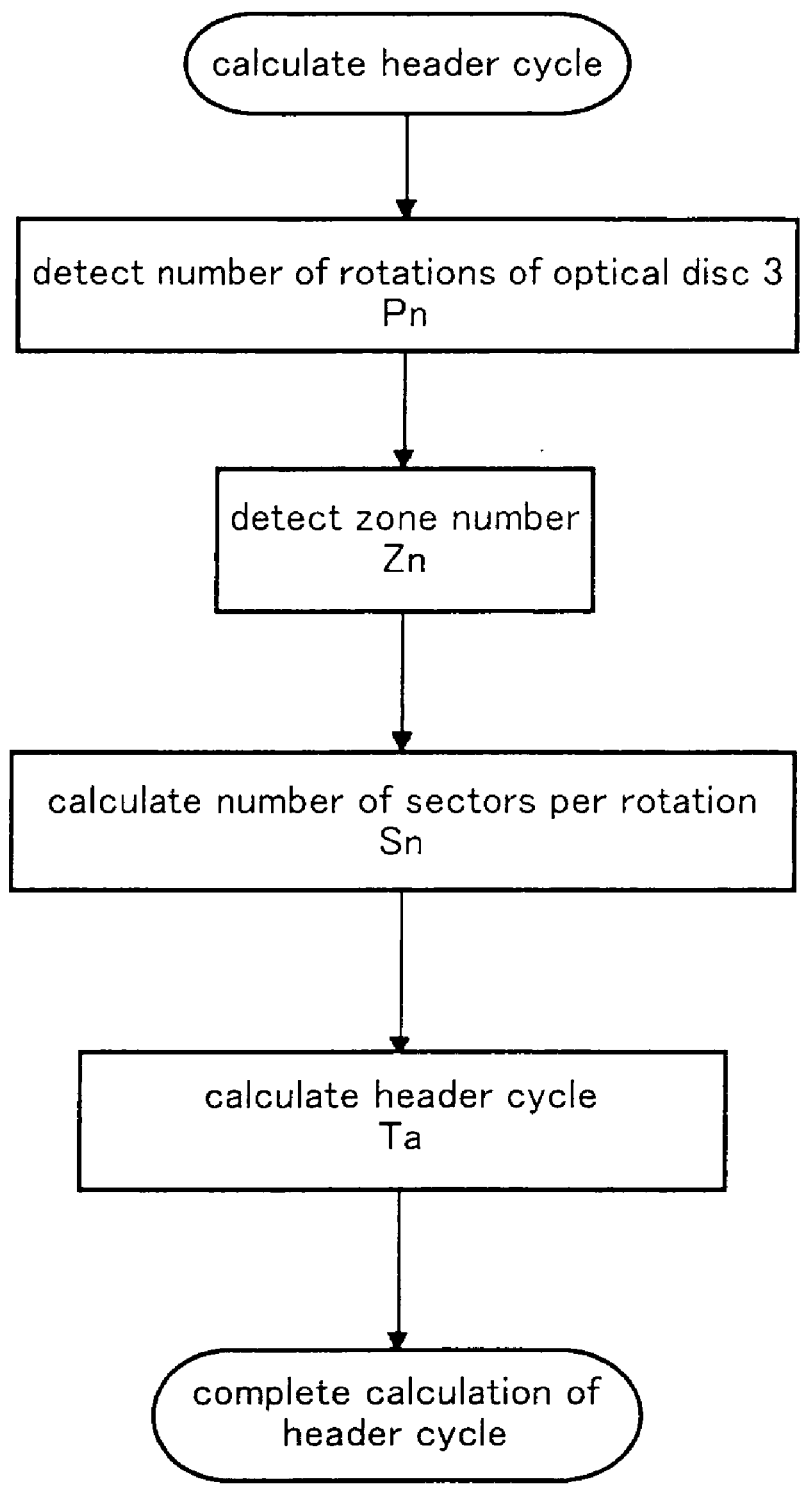
FIG. 5 is a flow chart of another method of calculating the header cycle.

As an alternative possible method of calculating the header cycle Ta, as shown in a flow chart of FIG. 5, number of rotations Pn of the optical disc is detected, a zone number Zn is identified based on the detected number of rotations Pn, number of sectors Sn per one rotation is identified based on the identified zone number Zn, and then, the header cycle Ta can be calculated based on the identified number of the sectors Sn per one rotation.

As an example of a method of identifying the number of the sectors Sn per one rotation, a sector number table showing the number of the sectors Sn with respect to the zone number Zn is generated and memorized in advance, and the number of the sectors Sn corresponding to the zone number Zn is calculated based on the sector number table. The header cycle Ta can be calculated based on the number of rotations Pn and the number of the sectors Sn.

Figure 6:
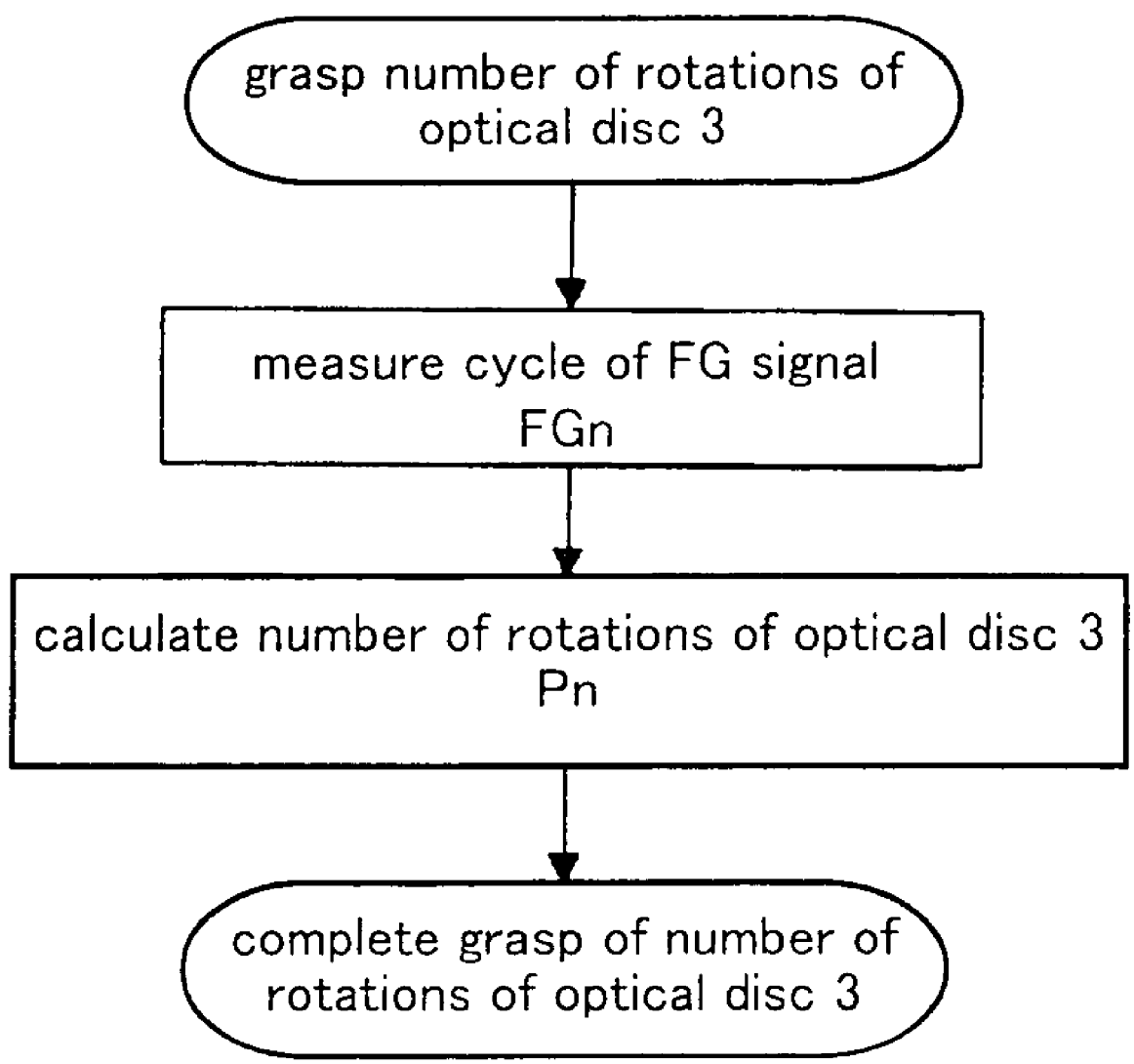
FIG. 6 is a flow chart of a method of calculating the number of rotations of the optical disc.

As an example of a method of calculating the number of rotations of the optical disc, as shown in FIG. 6, a cycle FGn of a FG signal (signal synchronizing with the rotation of the disc motor) is calculated, and the number of rotations Pn of the optical disc is calculated based on the calculated cycle FGn.

Figure 7:
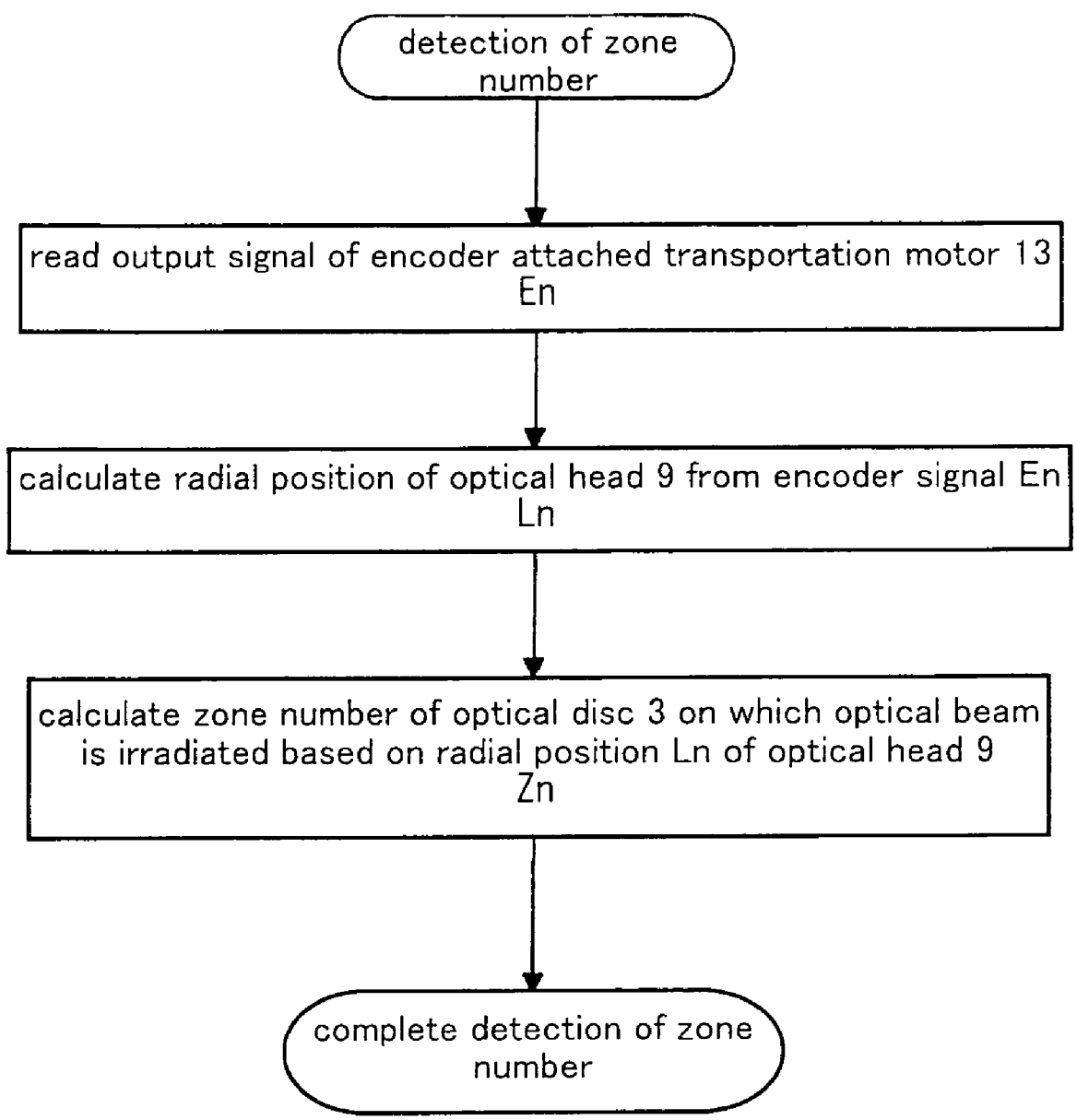
FIG. 7 is a flow chart of a method of calculating a zone number.

As an example of a method of calculating the zone number Zn, as shown in FIG. 7, an output signal En of an encoder, not shown, which is attached to the transportation motor 13, is read, a radial position Ln of the optical head 9 in the optical disc 3 is calculated from the read output signal En, and the zone number Zn of the optical disc 3 on which the optical beam is irradiated is identified based on the calculated radial position Ln.

Figure 8:
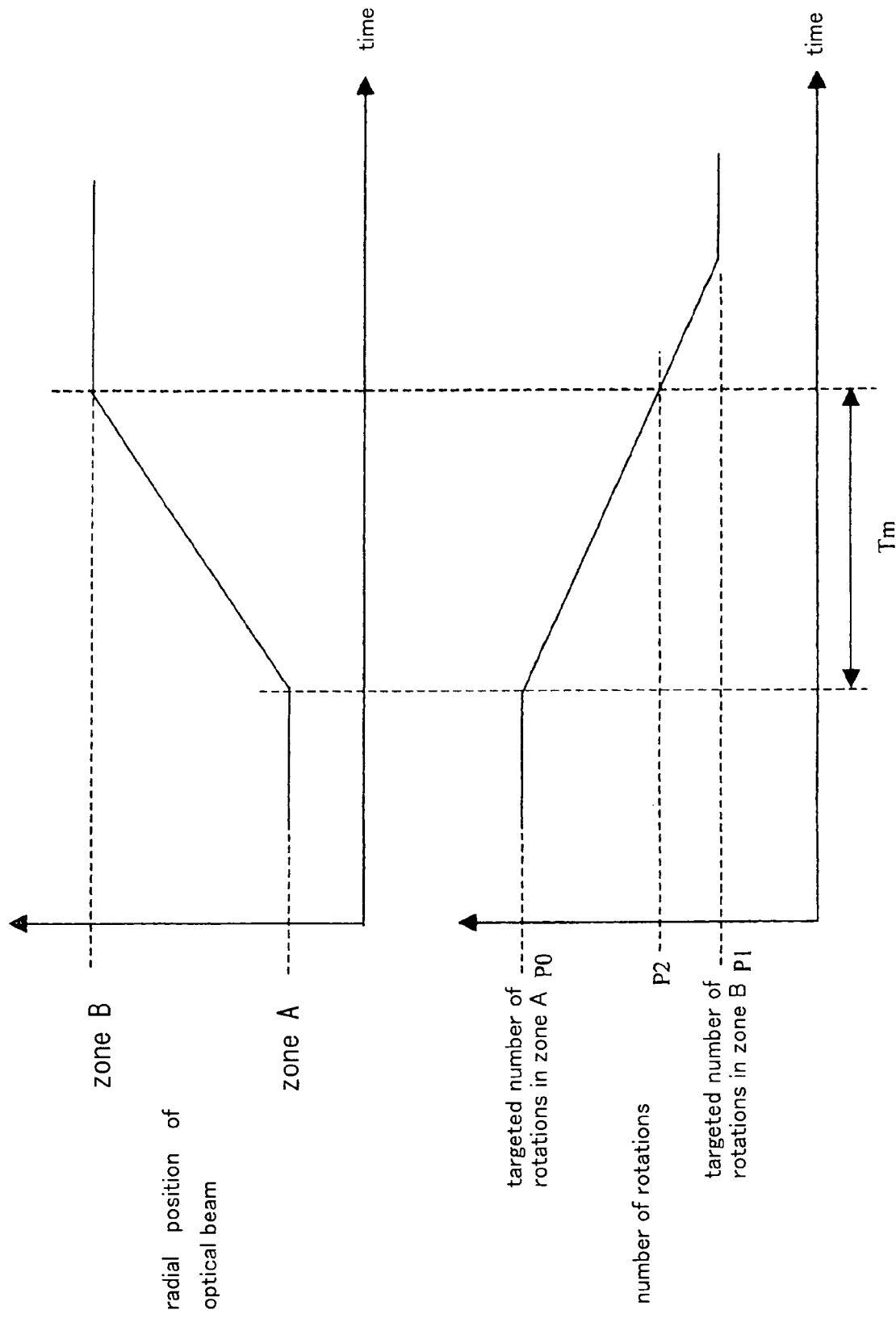
FIG. 8 is a graph showing variations of a radial position of an optical beam and the number of rotations of the optical disc relative to time.

As a method of calculating the number of rotations of the optical disc 3 in the case where the number of rotations of the optical disc 3 is radially different, as shown in FIG. 8, the radial positions of the optical beam with respect to the optical disc 3 in zones A and B and a moving time of the optical beam with respect to the optical disc 3 are obtained, and targeted numbers of rotations in the zones A and B in the disc motor 4 (rotation controls system) is calculated based on the obtained data. Accordingly, the number of rotations of the optical disc 3 in accordance with the responsiveness of the disc motor control system for controlling the number of rotations can be calculated even in the case where the number of rotations of the optical disc 3 is radially different and the optical beam radially moves.

Figure 9:
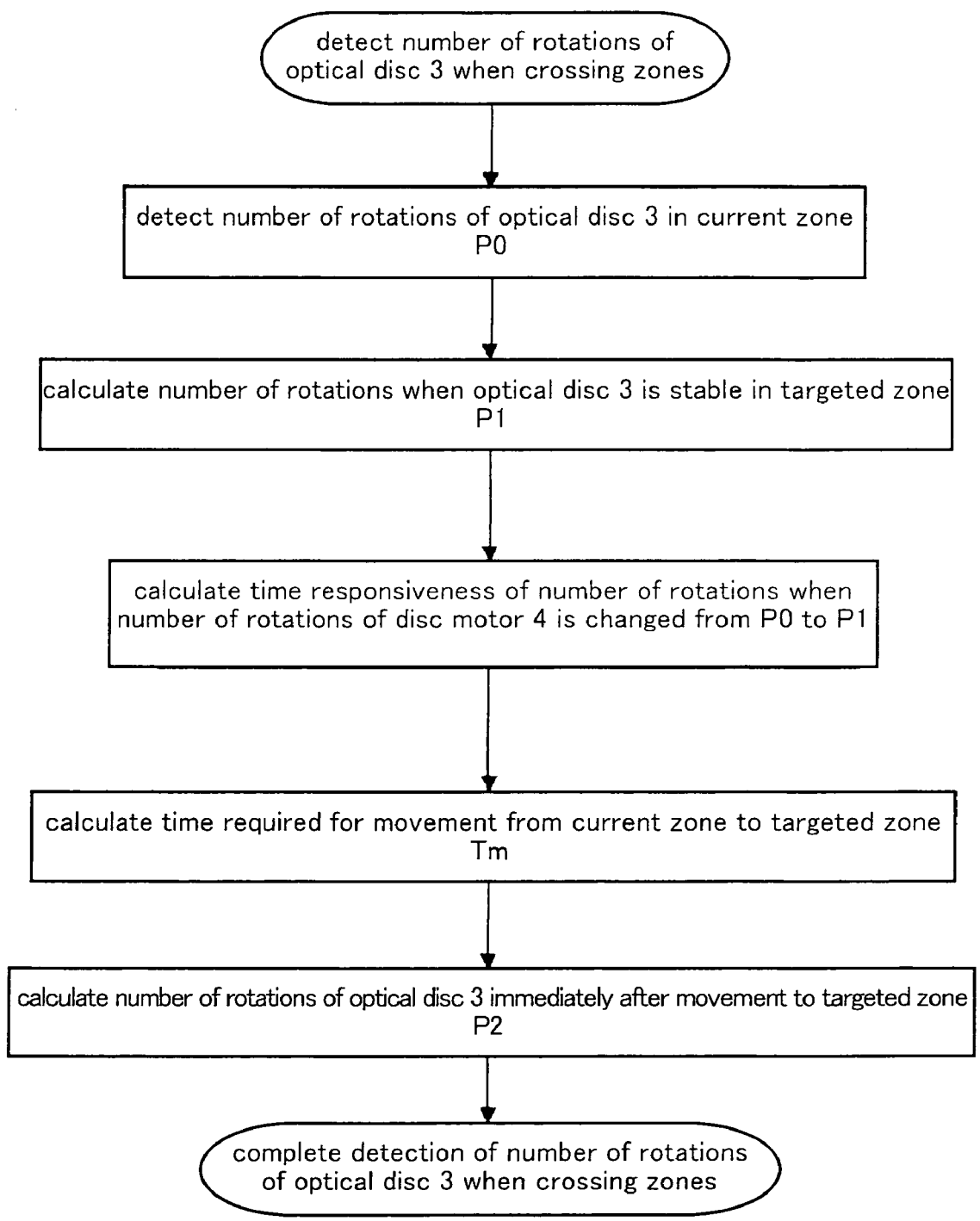
FIG. 9 is a flow chart of a method of calculating the number of rotations of the optical disc.

Below is described the calculation of the number of rotations of the optical disc 3 in the case where the optical beam moves across the adjacent two zones referring to FIG. 9. Number of rotations P0 of the optical disc 3 in the current zone A is calculated. More specifically, the number of rotations Pn of the optical disc 3 is calculated based on the cycle FGn of the FG signal. Next, number of rotations P1 of the optical disc which is in a stable state in the targeted B zone is obtained. Next, a time responsiveness of the number of rotations when the number of rotations of the disc motor is changed from P0 to P1 is calculated. Then, a time Tm required for the movement of the optical beam from the current zone A to the targeted zone B is calculated, and number of rotations P2 of the optical disc 3 immediately after the optical beam has reached the targeted zone B is calculated. More specifically, the number of rotations P2 after the time Tm has passed is calculated based on the time responsiveness of the number of rotations in the case where the number of rotations is changed from P0 to P1. Then, the number of rotations of the optical disc 3 immediately after the optical beam has traveled across the zones.

As described, in the selection of the track jumping scan modes, the reference cycle and the header cycle are compared to each other, and one of the first mode (half track jumping scan mode) and the second mode (scan mode in which the full track jumping scan mode and the half track jumping scan and the full track jumping scan are mixedly present) is selected based on the comparison result in order to accordingly execute the tracking drive. Hereinafter, the full track jumping scan mode is referred to as a 2-1 mode, and the scan mode in which the full track jumping scan mode and the half track jumping scan are mixedly present is referred to as a 2-2 mode.

Figure 10:
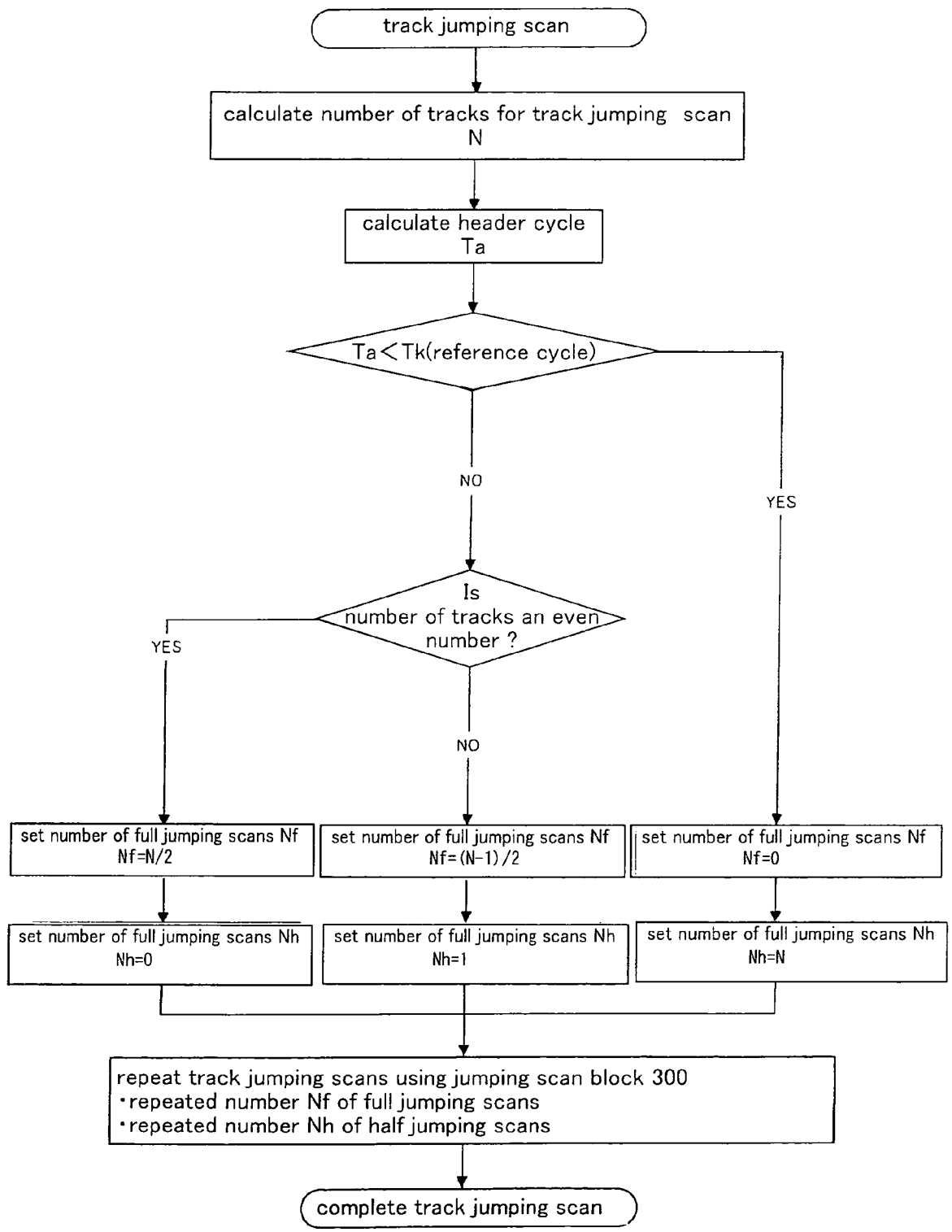
FIG. 10 is a flow chart of a method of selecting a track jumping scan.

The selection of the track jumping scan modes is further described referring to a flow chart shown in FIG. 10. The searching circuit 27 calculates number of tracks N for the track jumping scan based on a search instruction from the microcomputer not shown. The number of tracks N for the track jumping scan is calculated based on a difference between the current address and the targeted address. Next, the header cycle Ta is calculated. Then, the lengths of the header cycle Ta and the reference cycle Tk are compared to each other, and the scan mode is determined as follows based on a result of the comparison.

> header cycle Ta<reference cycle TK

In this case, number Nf of the full track jumping scans is set as Nf=0, and number Nh of the half track jumping scans is set as Nh=N. The first mode is thereby set.

> header cycle Ta>reference cycle TK, and number of tracks N for track jumping scan is an even number In this case, the number Nf of the full track jumping scans is set as Nf=N/2, and the number Nh of the half track jumping scans is set as Nh=0. The 2-1 mode is thereby set.

> header cycle Ta>reference cycle TK, and number of tracks N for track jumping scan is an odd number In this case, the number Nf of the full track jumping scans is set as Nf=(N-1), and the number Nh of the half track jumping scans is set as Nh=1. The 2-2 mode is thereby set After the foregoing settings are completed, the searching circuit 27 repeatedly executes the track jumping scans equal to the number of tracks N for the track jumping scan and terminates the scans.

Figure 11:
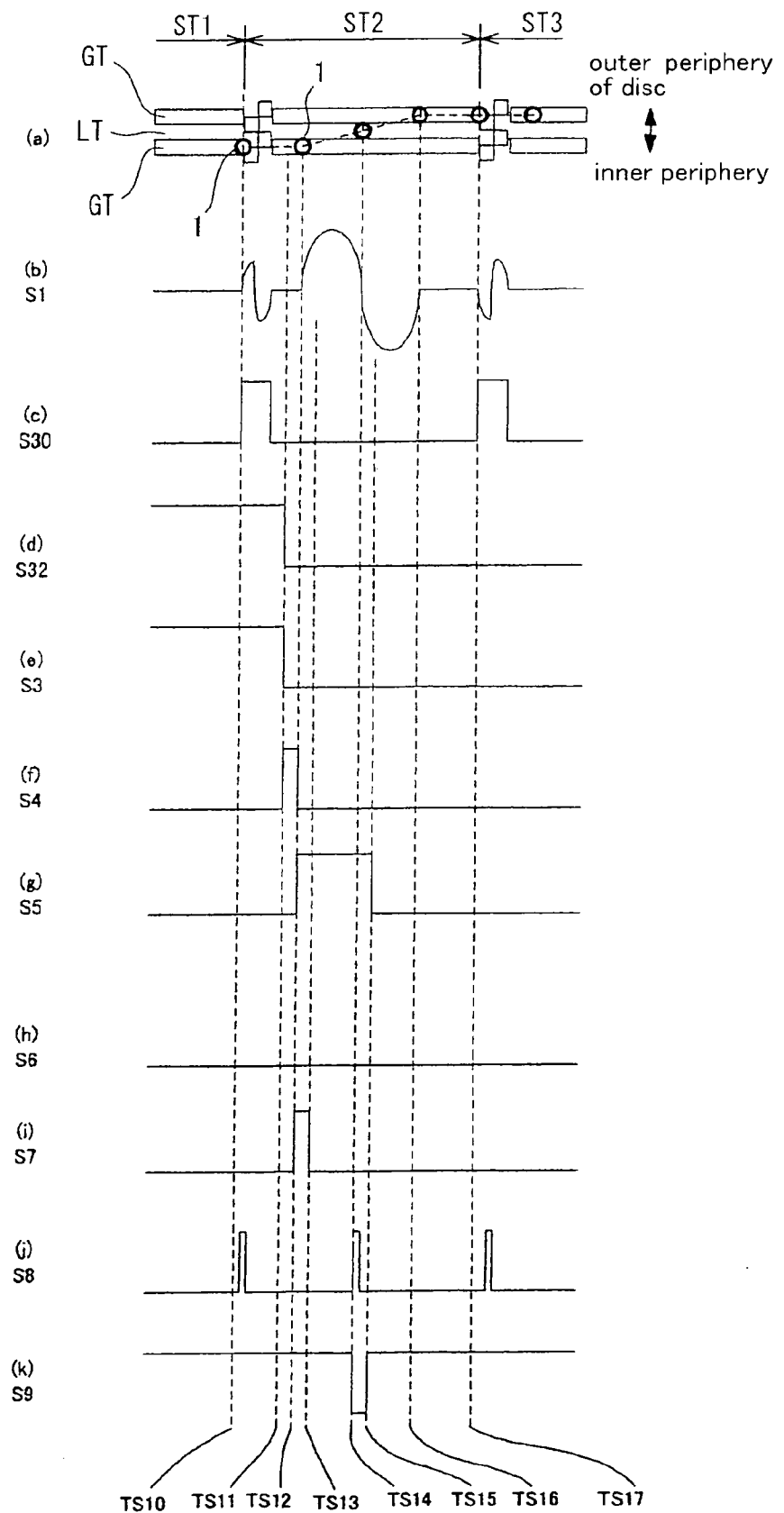
FIG. 11 shows timing charts of signals of respective parts in a full track jumping scan.

Referring to FIG. 11, an example of applying the full track jumping scan to the track is described. In FIG. 11, (a) is a plan view showing a part of the sectors on the optical disc 3. In (a), two groove tracks GT and a land track LT sandwiched by the adjacent groove tracks GT are shown in the recording region, and CAPA is shown in the header region. A vertical direction in the drawings is the radial direction of the disc, and an upper direction in the drawings is the outer-peripheral direction. The example given here is a case where the optical beam 1 shown by a solid circle executes the full track jumping scan from the groove track GT to another groove track GT adjacent thereto on the outer-peripheral side during the track jumping scan. A trajectory of the optical beam 1 in this case is shown by a dotted line in (a).

In FIG. 11, (b)-(k) are timing charts of the respective signals corresponding to positions in the trajectory of the optical beam 1 shown in (a). (b) shows the tracking error signal S1, (c) shows the header signal S30, (d) shows the half track jumping scan/full track jumping scan switching signal S32, (e) shows the track jumping scan direction signal S3, (f) shows the track jumping scan instruction signal S4, (g) shows the tracking control ON/OFF switching signal S5, (h) shows the land track/groove track switching signal S6, (i) shows the acceleration drive pulse S7 outputted by the acceleration drive pulse generating circuit 29, (j) shows the trigger signal S8 outputted by the trigger signal output circuit 24, and (k) shows the deceleration drive pulse S9 outputted by the deceleration drive pulse generating circuit 30.

Before the track jumping scan starts, the tracking control ON/OFF switch 21 is closed when the tracking control ON/OFF switching signal S5 (outputted by the searching circuit 27: see (g) in FIG. 11) is at a low level, and the tracking control is thereby in the ON state. More specifically, the tracking control is in the ON state in a period at and before a timing TS12 and a period at and after a timing TS15, while the tracking control is in the OFF state a period of the timings TS12-TS15.

At a timing TS10 included in the period when the tracking control is ON, the optical beam 1 falls on a border between the inner-peripheral-side groove track GT in the recording region of a first sector ST1 and the header region of a second sector ST2 subsequent thereto. As the optical beam 1 moves to the header region of the second sector ST2 at and after the timing TS10, a waveform of the tracking error signal S1 (outputted by the differential circuit 14 of the tracking control block 200) changes based on the CAPA in the header region of the second sector ST2 (see (b) in FIG. 11).

At the same time, the header signal S30 (outputted by the header discriminating circuit 40) rises at a time point when the optical beam 1 starts to pass through the CAPA in the header region of the second sector ST2 (timing TS10), and falls when the optical beam 1 has passed through the CAPA (see (c) in FIG. 11). At the time, the tracking error signal S1 crosses the zero level due to the CAPA in the header region of the second sector ST2, and the trigger signal S8 is generated in the form of a short pulse (see (j) in FIG. 11).

In a period of the timings TS10-TS11 when the optical beam 1 passes through the header region of the second sector TS2, the track jumping scan is not executed, and the optical beam 1 is tracking-controlled and moved. When the optical beam 1 has moved to the groove track GT of the second sector ST2 (timing TS11), the half track jumping scan/full track jumping scan switching signal S32 (outputted by the searching circuit 27) falls (see (d) in FIG. 11), and the half track jumping scan/full track jumping scan selecting switch 50 is switched to a contact-b side in response to the fall of the signal. As a result, the 2-1 mode (full track jumping scan mode) is selected as the track jumping scan mode.

When the track jumping scan direction switching signal S3 (outputted by the searching circuit 27) falls, the jumping direction is set to the outer peripheral side of the disc by the jumping direction inverting circuit 32, and the jumping instruction signal S4 is supplied from the searching circuit 27 to the jumping scan control circuit 28 at the same time. At the timing TS12 when all of the preparations for the track jumping scan are completed, the searching circuit 27 opens the tracking control ON/OFF switch 21 so that the tracking control is in the OFF state. At the same time, the acceleration drive pulse generating circuit 29 outputs the acceleration drive pulse S7 based on the control signal S11 (outputted by the jumping scan control circuit 28) (see (i) in FIG. 11).

The acceleration drive pulse S7 is supplied as the tracking drive signal to the disc/head block 100 via the differential circuit 31, jumping direction inverting circuit 32 and adding circuit 22 of the tracking control block 200. A period of the acceleration is the timings TS12-TS13. The optical beam 1 is moved from the inner-peripheral-side groove track GT of the second sector ST2 to the outer-peripheral-side groove track GT by the acceleration. Then, the track jumping scan is executed.

After the acceleration drive pulse S7 fell, the optical beam 1 moves to the outer-peripheral-side groove track GT of the second sector ST2 on the outer peripheral side of the disc by inertia resulting from the acceleration. The waveform of the tracking error signal S1 changes in accordance with the movement of the optical beam 1 (see (b) in FIG. 11). As the optical beam 1 moves from an intermediate point in the inner-peripheral-side groove track GT of the second sector ST2 to the outer peripheral side, the change of the waveform of the tracking error signal S1 is increased, maximized at a border with respect to the land track LT of the second sector ST2, thereafter gradually reduced. Then, the tracking error signal S1 crosses the zero level at an intermediate position in the land track LT at the timing TS14, and the trigger signal S8 (outputted by the trigger signal output circuit 24) rises (see (j) in FIG. 11).

The trigger signal S8 is inputted to the deceleration drive pulse generating circuit 30, and the deceleration drive pulse S9 is supplied to the disc/head block 100 as the tracking drive signal via the differential circuit 31, jumping direction inverting circuit 32, adding circuit 22 of the tracking control block 200 (see (k) in FIG. 11). The optical beam 1 is thereby decelerated.

At the timing TS15 after the deceleration drive pulse S9 fell, the tracking control ON/OFF switching signal S5 falls (see (g) in FIG. 11), and the tracking control is thereby in the ON state. Accordingly, the optical beam 1 is drawn into the outer-peripheral-side groove track GT of the second sector ST by the tracking control. When the optical beam 1 is tracking-controlled at an intermediate point in the outer-peripheral-side groove track GT of the second sector ST2 at a timing TS16, the optical beam 1 is tracking-controlled until a timing TS17 when the optical beam 1 reaches the header region of the next third sector ST3. The foregoing operation is repeated at and after the timing TS17.

Figure 12:
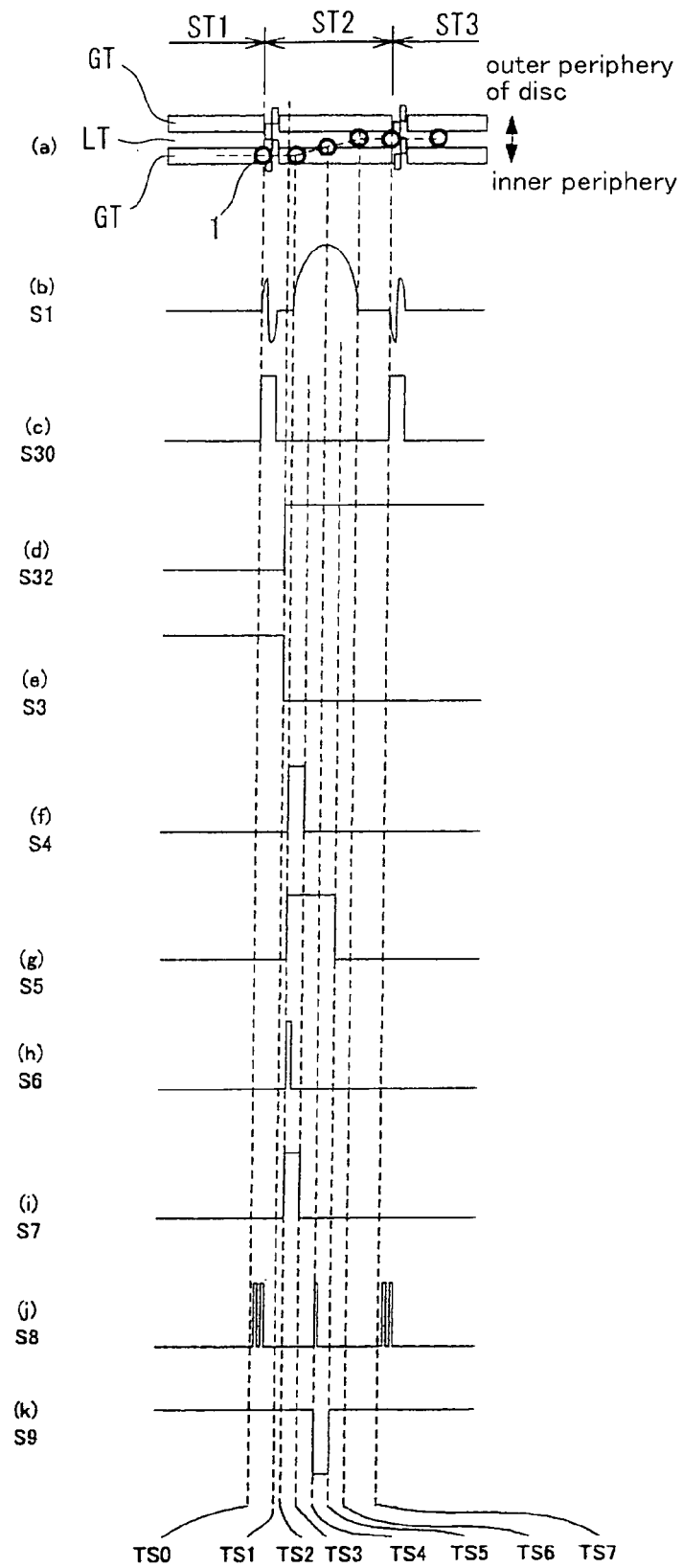
FIG. 12 shows timing charts of the signals of the respective parts in a half track jumping scan.

Referring to FIG. 12, an example where the optical beam 1 executes the half track jumping scan to the track is described. In FIG. 12, (a) is a plan view showing a part of the sectors on the optical disc 3. In (a), two groove tracks GT and a land track LT sandwiched by the adjacent groove tracks GT are shown in the recording region, and the CAPA is shown in the header region. A vertical direction in the drawing is the radial direction of the disc, and an upper direction in the drawing is the outer peripheral direction. In the example given here, the optical beam 1 shown by a solid circle executes the track jumping scan from the groove track GT to another groove track GT adjacent thereto on the outer peripheral side. A trajectory of the optical beam 1 is shown by a dotted line in (a).

In FIG. 12, (b)-(k) are timing charts of the respective signals corresponding to positions in the trajectory of the optical beam 1 shown in (a) in FIG. 12. (b) shows the tracking error signal S1, (c) shows the header signal S30, (d) shows the half track jumping scan/full track jumping scan switching signal S32, (e) shows the track jumping scan direction signal S3, (f) shows the track jumping scan instruction signal S4, (g) shows the tracking control ON/OFF switching signal S5, (h) shows the land track/groove track switching signal S6, (i) shows the acceleration drive pulse S7 outputted by the acceleration drive pulse generating circuit 29, (j) shows the trigger signal S8 outputted by the trigger signal output circuit 24, (k) shows the deceleration drive pulse S9 outputted by the deceleration drive pulse generating circuit 30.

The tracking control ON/OFF switch 21 is closed when the tracking control ON/OFF switching signal S5 from the searching circuit 27 (see (g) in FIG. 12) is at the low level before the track jumping scan starts, and the tracking control is in the ON state. More specifically, the tracking control is ON in a period at and before the timing TS2 and a period at and after the timing TS5, while the tracking control is OFF in a period between the timings TS2-TS5.

At the timing TS0 included in the ON period of the tracking control, the optical beam 1 falls on the border between the groove track GT in the recording region of the first sector ST1 and the header region of the second sector ST2 subsequent thereto. At and after the timing TS0, the waveform of the tracking error signal S1 (outputted by the differential circuit 14 of the tracking control block 200) is changed based on the CAPA in the header region of the second sector ST2 (see (b) in FIG. 12) as the optical beam 1 moves to the header region.

At the same time, the header signal S30 (outputted by the header discriminating circuit 40) rises at a time point when the optical beam 1 starts to pass through the CAPA in the header region of the second sector ST2 (timing TS0), and falls at a time point when the optical beam 1 has passed through the CAPA (see (c) in FIG. 12). At the time, the tracking error signal S1 crosses the zero level due to the CAPA, and the trigger signal S8 is thereby generated in the form of the short pulse (see (j) in FIG. 12).

In a period of the timing TS0-TS1 when the optical beam 1 passes through the header region of the second sector ST2, the tracking control is not executed, and the optical beam 1 is tracking-controlled and moved. When the optical beam 1 has moved to the groove track GT of the second sector ST2 (timing TS1), the half tack jumping scan/full track jumping scan switching signal S32 (outputted by the searching circuit 27) rises (see (d) in FIG. 12). In response to the rise of the signal, the half tack jumping scan/full track jumping scan switching signal S50 is switched to a contact-a side, and the first mode (half track jumping scan) is selected as the track jumping scan mode.

When the track jumping scan direction switching signal S3 (outputted by the searching circuit 27) falls, the jumping direction is set to the outer peripheral side of the disc by the jumping direction inverting circuit 32. At the same time, the jumping instruction signal S4 is supplied from the searching circuit 27 to the jumping scan control circuit 28. At the timing TS2 when all of the preparations for the track jumping scan are thus completed, the searching circuit 27 opens the tracking control ON/OFF selecting switch 21, and the tracking control is thereby in the OFF state. At the same time, the acceleration drive pulse generating circuit 29 outputs the acceleration drive pulse S7 based on the control signal S11 (outputted by the jumping scan control circuit 28) (see (i) in FIG. 12).

The acceleration drive pulse S7 is supplied to the disc/head block 100 as the tracking drive signal via the differential circuit 31, jumping direction inverting circuit 32, adding circuit 22 of the tracking control block 200. The acceleration period is the timings TS2-TS3. The acceleration moves the optical beam 1 from the inner-peripheral-side groove track GT of the second sector ST2 to the land track LT on the outer peripheral side. After the acceleration drive pulse S7 falls, the optical beam 1 moves to the outer-peripheral-side groove track GT of the second sector ST2 by the acceleration inertia. The waveform of the tracking error signal S1 changes in accordance with the movement of the optical beam 1 (see (b) in FIG. 12). As the optical beam 1 moves from an intermediate point in the inner-peripheral-side groove track GT of the second sector ST2 to the outer peripheral side, the change of the waveform of the tracking error signal S1 increases, maximized on the border with respect to the land track LT, and thereafter gradually reduced. The tracking error signal S1 crosses the zero level at the intermediate point in the land track LT at the timing TS6, and the trigger signal S8 rises at the timing TS4 when the waveform of the tracking error signal S1 shows an extreme value (see (j) in FIG. 12) because the half track jumping scan/full track jumping scan selecting switch 50 is switched to the half jumping scan contact-a side, and the output of the differential circuit 23 is supplied to the trigger signal output circuit 24.

The trigger signal S8 is supplied to the deceleration drive pulse generating circuit 30. The deceleration drive pulse S9 is supplied to the disc/head block 100 as the tracking drive signal via the differential circuit 31, jumping direction inverting circuit 32, adding circuit 22 of the tracking control block 200 (see (k) in FIG. 12). The optical beam 1 is thereby decelerated.

At the timing TS5 after the deceleration drive pulse S9 rises, the tracking control ON/OFF switching signal S5 falls (see (g) in FIG. 12), and the tracking control is thereby in the ON state. The optical beam 1 is drawn into the land track LT of the second sector ST2 by the tracking control. When the optical beam 1 is tracking-controlled at the intermediate point in the land track LT of the second sector ST2 at the timing TS6, the optical beam 1 is tracking-controlled until the timing TS7 when the optical beam 1 reaches the header region of the third sector ST3 subsequent thereto. The same operation as described earlier is repeated at and after the timing TS7.

Preferred Embodiment 2

Figure 13:
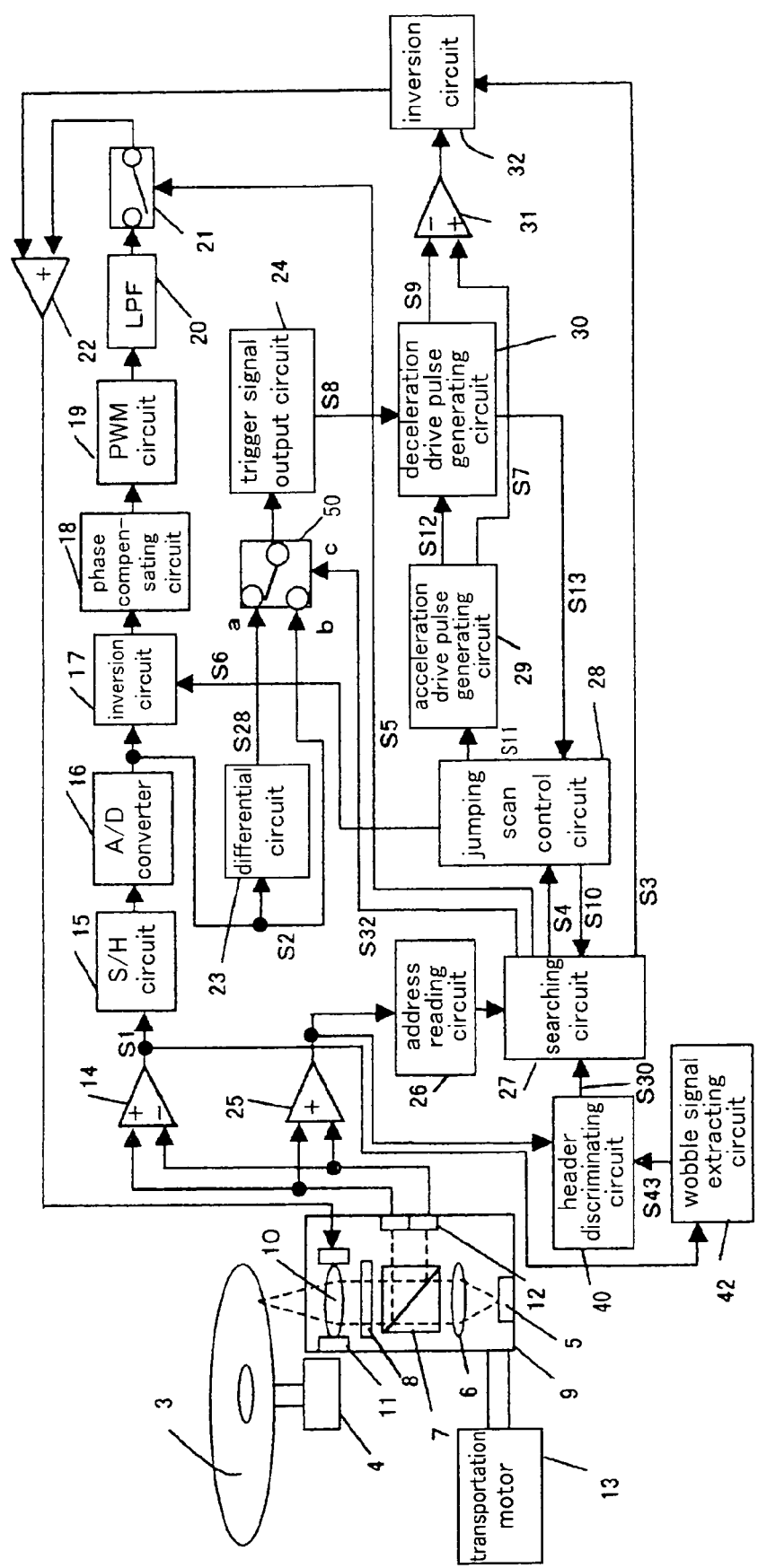
FIG. 13 is a block diagram illustrating a constitution of a track searching device according to a preferred embodiment 2 of the present invention.

A preferred embodiment 2 of the present invention is described referring to FIG. 13. In the preferred embodiment 2, the timing of starting the acceleration drive pulse S7 is delayed so that the timing of starting the deceleration drive pulse S9 and the header region do not overlap with each other in the optical beam track jumping scan so that the timing of driving the deceleration drive pulse S9 can be more accurate. Further, the period from the time point when the tracking control is operated again after the deceleration drive pulse S9 is outputted to the time point when the optical beam 1 reaches the header region of the next sector is extended so that the tracking control during the period can be stable.

The preferred embodiment 2 is characterized in that the acceleration drive pulse S7 is outputted after the optical beam 1 passed through the header region so that the timing of the deceleration drive pulse S9 is set after the optical beam 1 passed through the header region of the next sector. In order to realize the foregoing constitution, according to the present preferred embodiment, a wobble signal extracting circuit 42 for extracting a wobble signal S43 from the tracking error signal S1 is provided between the differential circuit 14 of the tracking control block 200 and the header discriminating circuit 40 of the track jumping scan block 300. The rest of the constitution shown in FIG. 13 is similar to that of FIG. 1.

In the preferred embodiment 2, a controller and a drive signal generator are further provided. The controller controls the movement of the optical head 9 (tracking actuator 11) which is a mover for moving the optical beam to the predetermined track. The controller controls the movement of the optical head 9 using a drive signal including the acceleration drive pulse for accelerating the optical head 9 and the deceleration drive pulse for decelerating the optical head 9. A part of the tracking control block 200 and a part of the track jumping scan block 300 (adding circuit, inverting circuit 32, differential circuit and the like) constitute the controller. The drive signal generator generates the drive signal and outputs the generated drive signal to the controller. A part of the track jumping scan block 300 (acceleration drive pulse generating circuit 29, deceleration drive pulse generating circuit 30 and the like) constitutes the drive signal generator.

In the preferred embodiment 2, the drive signal generator generates the acceleration drive pulse when the optical beam transmits through the track of an arbitrary sector and the deceleration drive pulse after the optical beam has passed through the header region of the next sector, and supplies the respective generated pulses to the controller. The controller controls the optical beam jumping scan using the drive signal including the acceleration drive pulse and the deceleration drive pulse.

Figure 14:
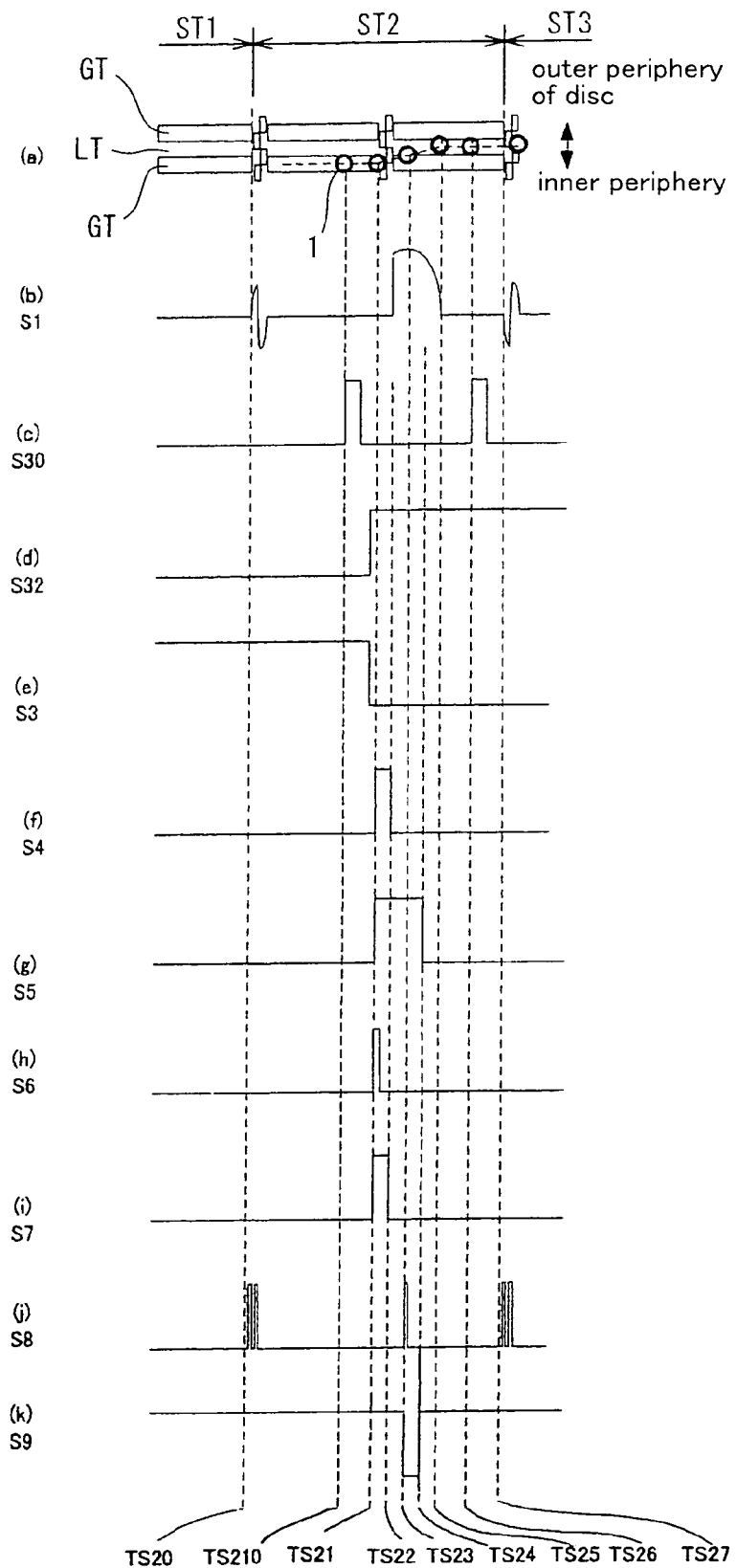
FIG. 14 shows timing charts of the signals of the respective parts in the half track jumping scan in FIG. 13.

Below is described an example where the optical beam 1 executes the half track jumping scan to the track referring to FIG. 14. In FIG. 14, (a) is a plan view showing a part of the sectors on the optical disc 3. In (a), two groove tracks GT and a land track LT sandwiched by the adjacent groove tracks GT are shown in the recording region, and the CAPA is shown in the header region. A vertical direction in the drawings is the radial direction of the disc, and an upper direction in the drawings is the outer-peripheral direction. The example given here is a case where the optical beam 1 shown by a solid circle executes the half track jumping scan from the groove track GT to another groove track GT adjacent thereto on the outer-peripheral side during the track jumping scan. A trajectory of the optical beam 1 in this case is shown by a dotted line in (a).

In FIG. 14, (b)-(k) are timing charts of the respective signals corresponding to positions in the trajectory of the optical beam 1 shown in (a). (b) shows the tracking error signal S1, (c) shows the header signal S30, (d) shows the half track jumping scan/full track jumping scan switching signal S32, (e) shows the track jumping scan direction signal S3, (f) shows the track jumping scan instruction signal S4, (g) shows the tracking control ON/OFF switching signal S5, (h) shows the land track/groove track switching signal S6, (i) shows the acceleration drive pulse S7 outputted by the acceleration drive pulse generating circuit 29, (j) shows the trigger signal S8 outputted by the trigger signal output circuit 24, and (k) shows the deceleration drive pulse S9 outputted by the deceleration drive pulse generating circuit 30.

Before the track jumping scan starts, the tracking control ON/OFF selecting switch 21 is closed when the tracking control ON/OFF switching signal S5 (outputted by the searching circuit 27): see (g) in FIG. 14) is at the low level, and the tracking control is thereby in the ON state. More specifically, the tracking control is in the ON state in a period at and before a timing TS21 and a period at and after a timing TS24, while the tracking control is in the OFF state in a period of the timings TS21-TS24.

At the timing TS20 included in the tracking control ON period, the optical beam 1 falls on a border between the groove track GT in the recording region of the first sector ST1 and the header region of the second sector ST2 subsequent thereto. As the optical beam 1 moves to the top header region of the second sector ST2 at and after the timing TS20, the waveform of the tracking error signal S1 (outputted by the differential circuit 14 of the tracking control block 200) is changed based on the CAPA in the header region of the second sector ST2 (see (b) in FIG. 14).

At the time, the trigger signal S8 is generated by the extreme value (maximum value in the present preferred embodiment) and the zero-crossing of the tracking error signal S1 (see (j) in FIG. 14). The wobble signal extracting circuit 42 extracts a wobble from the tracking error signal S1 to thereby generate a wobble signal S43, and supplies the generated wobble signal S43 to the header discriminating circuit 40. The wobble is adapted in such a manner that the land track and the groove track are wobbled so that the information is superposed. In the wobble thus constituted, clock information can be embedded.

The header discriminating circuit 40 identifies a timing TS210 based on the supplied wobble signal S43, and outputs the header signal S30 to the searching circuit 27 at the identified timing TS210 (see (c) in FIG. 14). The searching circuit 27 generates the half track jumping scan/full track jumping scan switching signal S32 in response to the input of the header signal S30 and supplies the generated signal to the half track jumping scan/full track jumping scan switch 50 so that the switch 50 is switched to the contact-a side (half track jumping scan mode) (see (d) in FIG. 14). The searching circuit 27 changes the jumping direction inversion signal S3 generated by itself to the low level to thereby invert the jumping direction to the outer peripheral side (see (e) in FIG. 14). The jumping scan control circuit 28 outputs the land track/groove track switching pulse S6 to the inverting circuit 17 at the timing TS21 after these processings are completed (see (h) in FIG. 14). The searching circuit 27 outputs the track jumping scan instruction signal S4 to the jumping scan control circuit 28 (see (f) in FIG. 14). Further, the searching circuit 27 raises the tracking ON/OFF switching signal S5 to thereby make the tracking control in the OFF state (see (g) in FIG. 14). The acceleration drive pulse generating circuit 29 outputs the acceleration drive pulse S7 based on the output of the jumping scan control circuit 28 which received the track jumping scan instruction signal S4 (see (i) in FIG. 14).

When the acceleration drive pulse S7 rises at the timing TS22 and the optical beam 1 moves to the border between the groove track GT and the land track LT, the trigger signal output circuit 24 generates the trigger signal S8 at the timing TS23 when the waveform of the tracking error signal S1 is maximized and supplies the generated signal to the deceleration drive pulse generating circuit 30 (see (j) in FIG. 14). The deceleration drive pulse generating circuit 30 which received the trigger signal S8 outputs the deceleration drive pulse S9 (see (k) in FIG. 14). Accordingly, the deceleration drive pulse S9 is generated at the timing TS24 after the optical beam 1 has transmitted through the header region of the second sector ST2. The tracking control ON/OFF switching signal S5 outputted by the searching circuit 27 rises at the timing TS24 after the deceleration drive pulse S9 is generated. The tracking control is in the ON state, and the optical beam 1 is drawn into the land track LT of the second sector ST2 by the tracking control (see (g) in FIG. 14). When the optical beam 1 is tracking-controlled at the intermediate point in the land track LT of the second sector ST2 at the timing TS25, the optical beam 1 is tracking-controlled until the timing TS26 when the optical beam 1 reaches the header region of the next third sector ST3. The same operations are repeated at and after the timing TS27.

Preferred Embodiment 3

Figure 15:
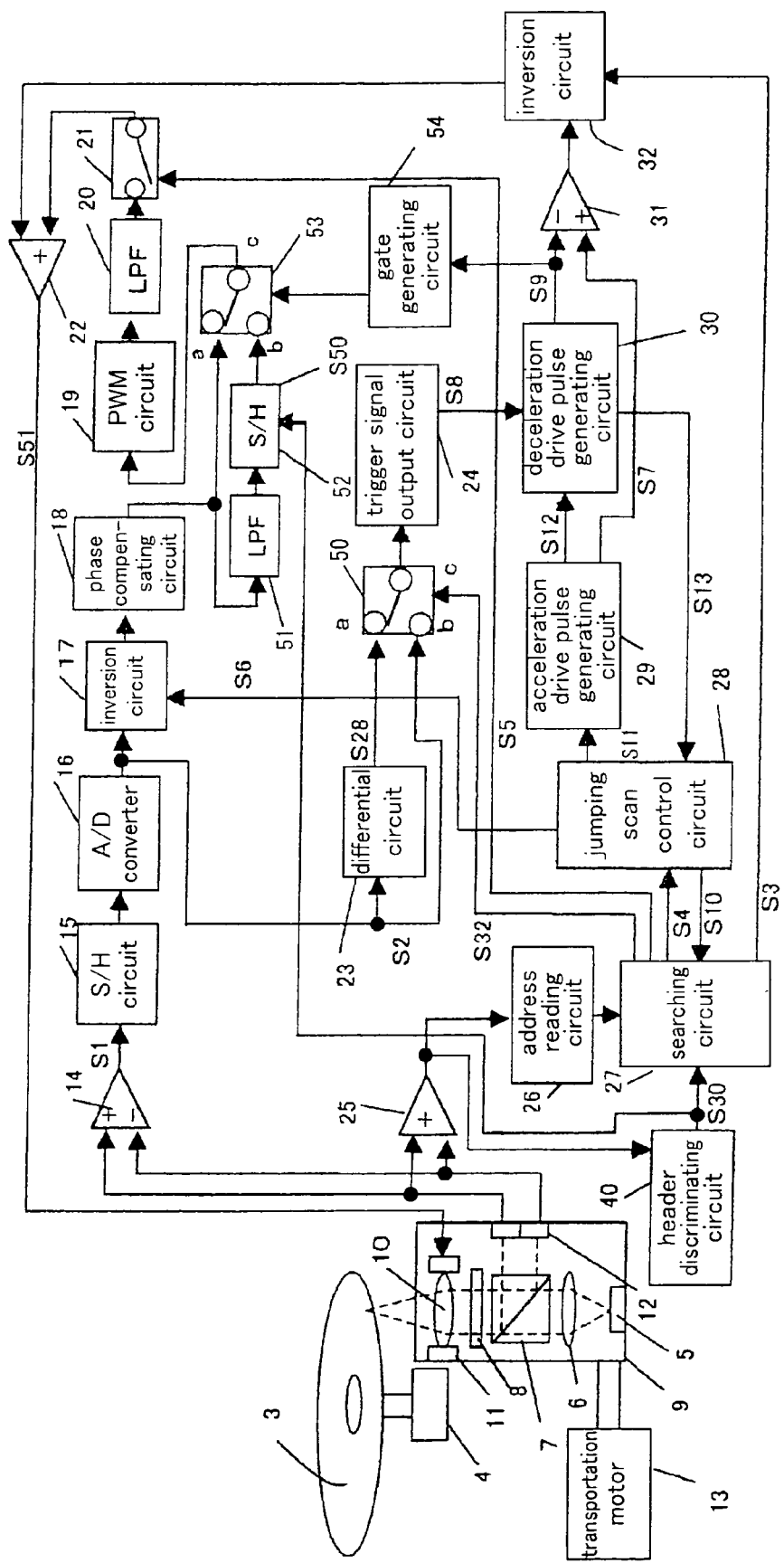
FIG. 15 is a block diagram illustrating a constitution of a track searching device according to a preferred embodiment 3 of the present invention.

A preferred embodiment 3 of the present invention is described referring to FIG. 15. In the preferred embodiments described so far, when the optical beam 1 transmits through the header region immediately after the track jumping scan is completed, that is immediately after the deceleration drive pulse S9 is terminated and the tracking control is shifted from the OFF state to the ON state again, the tracking control may be destabilized, which results in the failure to draw the optical beam 1 into the targeted track, because the tracking drive signal outputted to the tracking actuator 11 is disturbed. In the preferred embodiment 3, the drive signal is held in a sample hold circuit 52 during the period when the optical beam 1 is transmitting through the header region. In holding the drive signal, the tracking drive signal which satisfies the following conditions is used.

The signal has a frequency equal to or above a band of the tracking control.
The signal transmits through a low-pass filter 51 having a cut-off frequency equal to or below the disturbance of the tracking error signal S1 due to the header region.

When the foregoing tracking drive signal is used, the output value of the sample hold can follow the variation of the tracking drive signal immediately after the deceleration drive pulse S9 is terminated and the tracking control is operated again. As a result, the optical beam 1 can be drawn into the targeted track. Below is given a more detailed description.

In the preferred embodiment 3, the low-pass filter 51, sample hold circuit 52 and switch 53 are provided between the phase compensating circuit 18 and the PWM circuit 19 of the tracking control block 200. Further, the header signal S30 is outputted from the header discriminating circuit 40 to the sample hold circuit 52. As the low-pass filter 51 is provided a filter having the frequency equal to or above the band of the tracking control and equal to or below the frequency of the disturbance of the tracking error signal S1 due to the header region as its cut-off frequency so that a high frequency component of the output signal of the phase compensating circuit 18 is eliminated. Thus, the high frequency component of the tracking drive signal S51 can be removed. The sample hold circuit 52 samples the output drive signal of the low-pass filter 51 and holds the relevant value during the period when the optical beam 1 is transmitting through the header region. Digital circuits constitute the low-pass filter 51 and the sample hold circuit 52.

Figure 16:
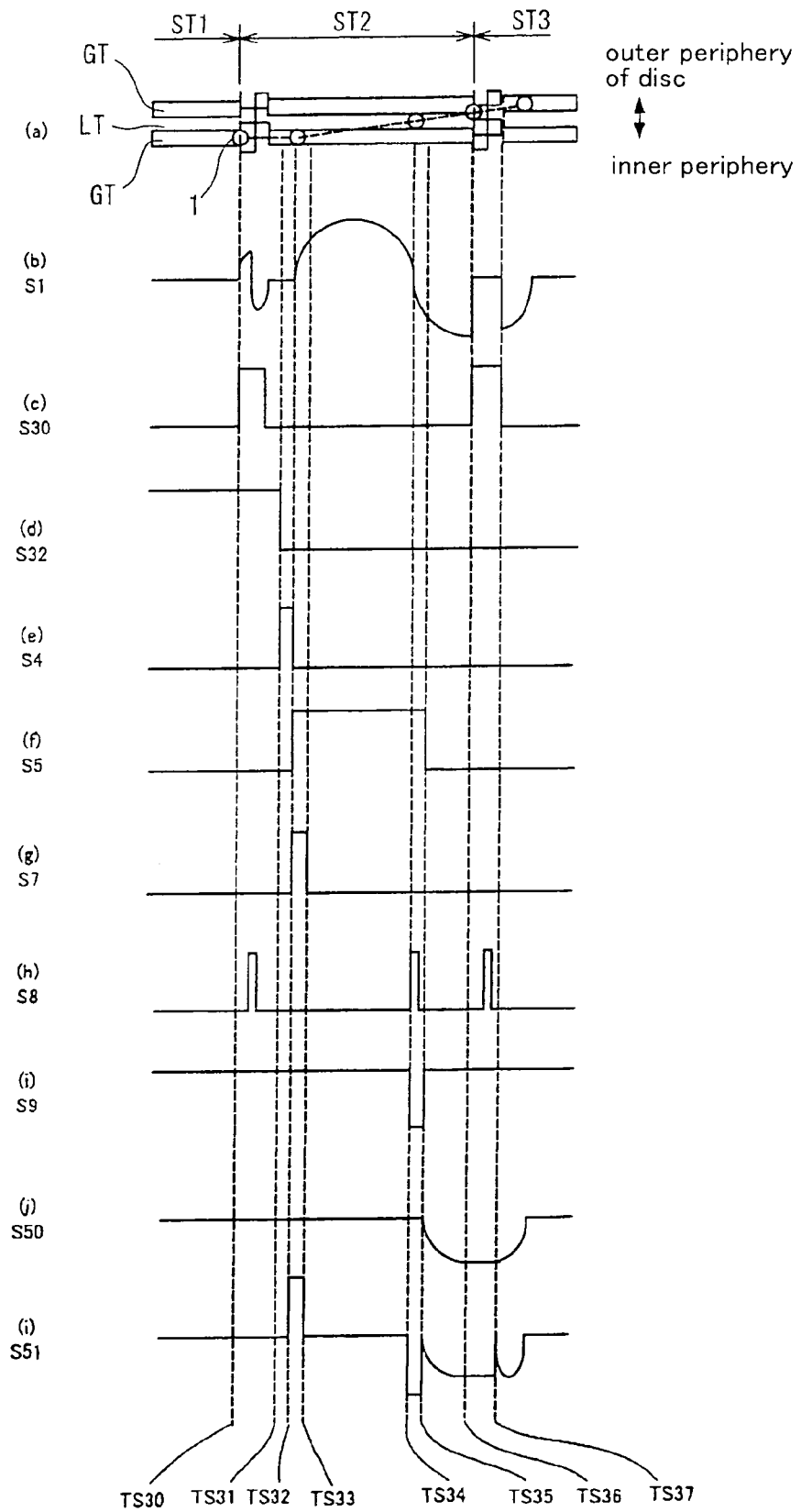
FIG. 16 shows timing charts of the signals of the respective parts in the full track jumping scan in FIG. 15.

Referring to FIG. 16, an example of executing the full track jumping scan to the track is described. In FIG. 16, (a) is a plan view showing a part of the sectors on the optical disc 3. In (a), two groove tracks GT and a land track LT sandwiched by the adjacent groove tracks GT are shown in the recording region, and the CAPA is shown in the header region. A vertical direction in the drawings is the radial direction of the disc, and an upper direction in the drawings is the outer-peripheral direction. An example given here is a case where the optical beam 1 shown by a solid circle execute the track jumping scan from the groove track GT to another groove track GT adjacent thereto on the outer-peripheral side. A trajectory of the optical beam 1 in this case is shown by a dotted line in (a).

In FIG. 16, (b)-(k) are timing charts of the respective signals corresponding to positions in the trajectory of the optical beam 1 shown in (a). (b) shows the tracking error signal S1, (c) shows the header signal S30, (d) shows the half track jumping scan/full track jumping scan switching signal S32, (e) shows the track jumping scan direction signal S4, (f) shows the tracking control ON/OFF switching signal S5, (g) shows the acceleration drive pulse S7 outputted by the acceleration drive pulse generating circuit 29, (h) shows the trigger signal S8 outputted by the trigger signal output circuit 24, (i) shows the deceleration drive pulse S9 outputted by the deceleration drive pulse generating circuit 30, (j) shows the sample hold signal S50 outputted by the sample hold circuit 52, and (k) shows the drive signal S51.

In a state before the timing TS 30, the tracking control ON/OFF switching signal S5 (outputted by the searching circuit: see (f) in FIG. 16) is at the low level, and the tracking control ON/OFF switch 21 is closed and the tracking control is in the ON state. More specifically, the tracking control is ON in a period at and before the timing TS32 and a period at and after the timing TS35, and the tracking control is OFF in a period of the timings TS32-T35.

At the timing TS30 included in the ON period of the tracking control, the optical beam 1 falls on the border between the inner-peripheral-side groove track GT in the recording region of the first sector ST1 and the top header region of the second sector ST2. As the optical beam 1 moves to the header region of the second sector ST2 at and after the timing TS30, the waveform of the tracking error signal S1 (outputted by the differential circuit 14 of the tracking control block 200) changes based on the CAPA (see (b) in FIG. 16).

At the same time, the header signal S30 (outputted by the header discriminating circuit 40) rises at the timing by which the optical beam 1 starts to transmit through the CAPA (timing TS30), and falls when the optical beam 1 has transmitted through the CAPA (see (c) in FIG. 16). The tracking error signal S1 crosses the zero level due to the CAPA, and the trigger signal S8 is thereby generated (see (h) in FIG. 16).

At the timing TS 31 when the optical beam 1 transmits through the header region of the second sector ST2, the half track jumping scan/full track jumping scan switching signal S32 from the searching circuit 27 falls (see (d) in FIG. 16), and the half track jumping scan/full track jumping scan selecting switch S50 is switched to the contact-b side, so that the full track jumping scan is selected. At the time, the jumping instruction signal S4 is supplied from the searching circuit 27 to the jumping scan control circuit 28 (see (c) in FIG. 16).

At the timing TS32, the tracking control ON/OFF switch 21 is opened by the tracking control ON/OFF switching signal S5 from the searching circuit 27, making the tracking control in the OFF state (see (f) in FIG. 16). At the time, the acceleration drive pulse S7 is simultaneously outputted from the acceleration drive pulse generating circuit 29 (see (g) in FIG. 16), as a result of which the drive signal S51 is outputted from the adding circuit 22 (see (k) in FIG. 16). The drive signal makes the optical beam 1 start to move from the inner-peripheral-side groove track GT of the second sector ST2 to the outer-peripheral-side groove track GT of the second sector ST2.

At the timing TS34, the deceleration drive pulse generating circuit 30 outputs the deceleration drive pulse S9 (see (i) in FIG. 16). During a predetermined period from the timing TS35 immediately after the output, the cut-off frequency of the low-pass filter 51 is equal to or more than the band of the tracking control and equal to or below the disturbance of the tracking error signal S1 due to the header region. Thereby, the sample hold signal S50 can follow the variation of the waveform of the output signal from the phase compensating circuit 18 at and after the timing TS35. More specifically, the waveforms of the output signal of the phase compensating circuit 18 and the output signal of the sample hold signal S50 during the period from the timing TS35 to the timing TS36 are substantially similar to each other. Therefore, the level of the drive signal S51 during the period from the timing TS36 when the optical beam 1 transmits through the header region to the timing TS37 corresponds to that of the output signal from the phase compensating circuit 18 at the timing TS35, and the drive signal S51 is not disturbed by the CAPA. Therefore, when the deceleration drive pulse S9 is terminated and the tracking control is operated again, the optical beam 1 can be drawn into the targeted outer-peripheral-side groove track GT of the second sector ST2. More specifically, the waveform of the tracking error signal S51 changes in the header region at the timing TS36 and the drive signal S51 thereby fluctuates in the absence of the low-pass filter. However, the fluctuation of the drive signal S51 does not appear in the sample hold signal S50 since the fluctuation is removed by the low-pass filter 51. Accordingly, the optical beam 1 can be drawn into the outer-peripheral-side groove track GT of the third sector ST3 while the optical beam 1 is being transmitted through the header region.

Preferred Embodiment 4

Figure 17:
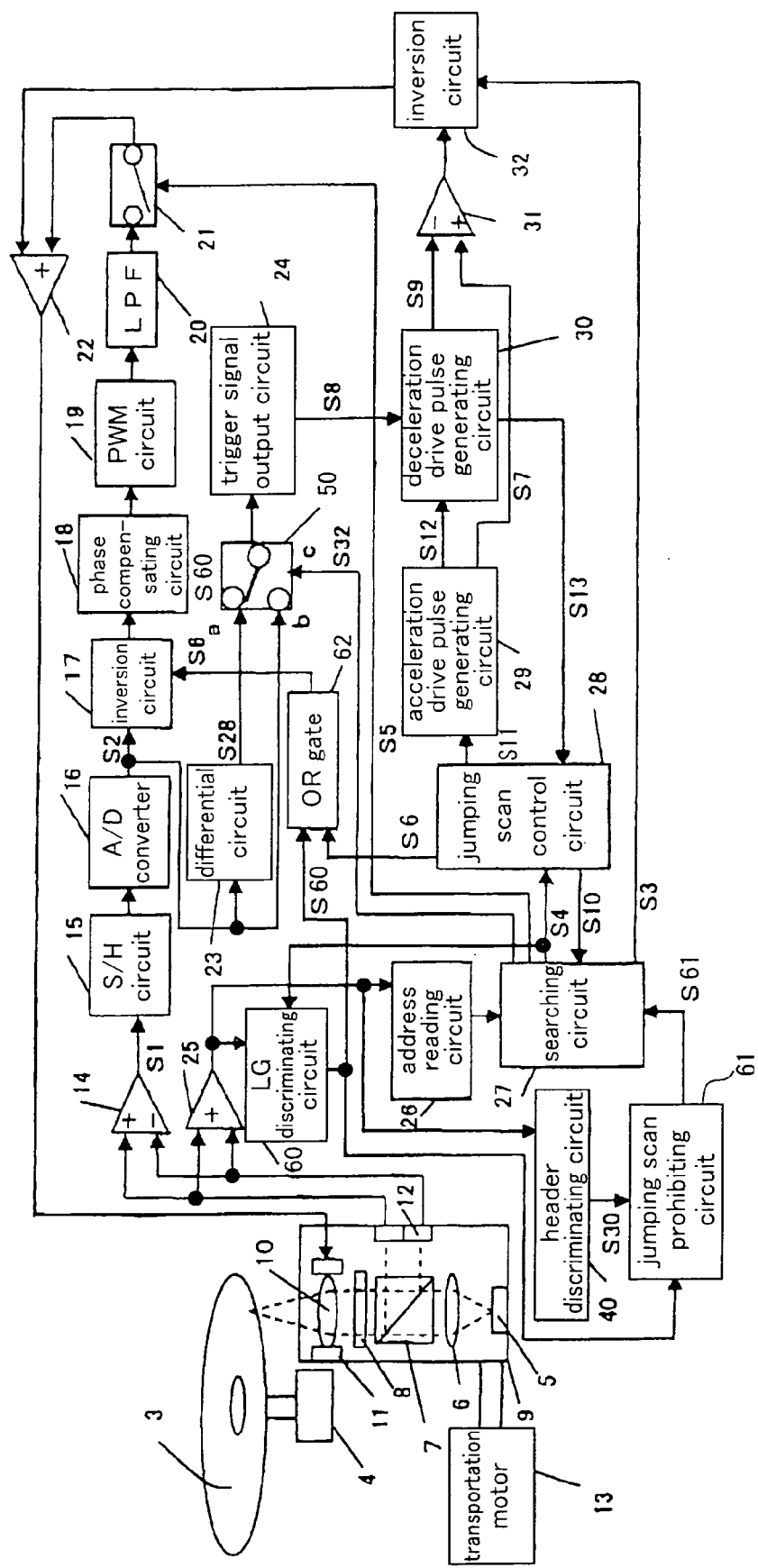
FIG. 17 is a block diagram illustrating a constitution of a track searching device according to a preferred embodiment 4 of the present invention.

A preferred embodiment 4 of the present invention is described referring to FIG. 17. In the preferred embodiment 4, a land track/groove track (LG) discriminating circuit 60, a jumping scan prohibiting circuit 61 and an OR gate 62 are provided. The LG discriminating circuit 62 is a circuit for executing a land track/groove track discriminating processing (discrimination of the land track LT and the groove track from each other) in accordance with a flow chart shown in FIG. 18. Below is described the preferred embodiment 4.

The optical disc 3 is adapted in such a manner that the land track LT and the groove track GT are switchingly selected per rotation as shown in FIG. 2. FIG. 2 shows the before-last sector, last sector and first sector in the switching operation. Because the optical disc 3 is adapted in such a switching manner, it is necessary for the optical beam to be controlled to follow the land track LT and the groove track GT in each rotation of the optical disc 3 when the tracking control is in the ON state. When the optical beam is switched, for example, from the land track LT to the groove track GT, the polarity of the tracking error signal S1 is switched in the tracking polarity inverting circuit 17. If the polarity of the tracking error signal S1 is not switched, the optical beam runs to the track in vicinity.

The LG discriminating circuit 60 reads a sector address (corresponds to the last sector) from the output of the adding circuit 25, and outputs a first land track/groove track (LG) switching signal S60 which switches to and from the land track LT and the groove track GT at a timing by which the optical beam reaches the header region (CAPA) of the first sector to the jumping scan prohibiting circuit 61 and the OR gate 62 when it is judged that the sector subsequent to the read sector address is the first sector. In other words, the first LG switching signal S60 is a pulse signal which is outputted in the header region of the next sector when the sector address is read and it is learnt that the next sector is the first sector. Therefore, the first LG switching signal S60 is not outputted in consequence of the half track jumping scan, and the first LG switching signal S60 is reset when the track jumping scan is executed before the optical beam reaches the next sector (header region in the first sector). A second LG switching signal S6 is outputted from the jumping scan control circuit 28 only when the half track jumping scan is executed, and the second LG switching signal S6 is not outputted in the header region in the first sector.

The jumping scan prohibiting circuit 61 generates and outputs a jumping scan prohibition signal S61. The jumping scan prohibition signal S61 is a signal resulting from the removal of a predetermined pulse corresponding to the header region from the header region S30.

The jumping scan prohibiting circuit 61 retains the following information:
a) current zone number
b) number of sectors in one lap of the zone
c) number of rotations of the disc is controlled to a predetermined number of rotations in the zone
d) information on a predetermined time immediately before the first sector The jumping scan prohibiting circuit 61 generates the jumping scan prohibition signal S61 based on the first LG switching signal S60 and the information of a)-d).

The first and second LG switching signals S60 and S6 are inputted to the OR gate 62. The tracking control in which the optical beam follows the land track LT and the tracking control in which the optical beam follows the groove track GT are switchingly selected when the polarity of the tracking error signal S1 is switched by the tracking polarity inverting circuit 17. The switching operation generated when the optical beam follows the track without the track jumping scan includes the switching operation generated when the optical beam transmits through the header region of the first sector per rotation and the switching operation generated when the half track jumping scan is executed.

Figure 18:
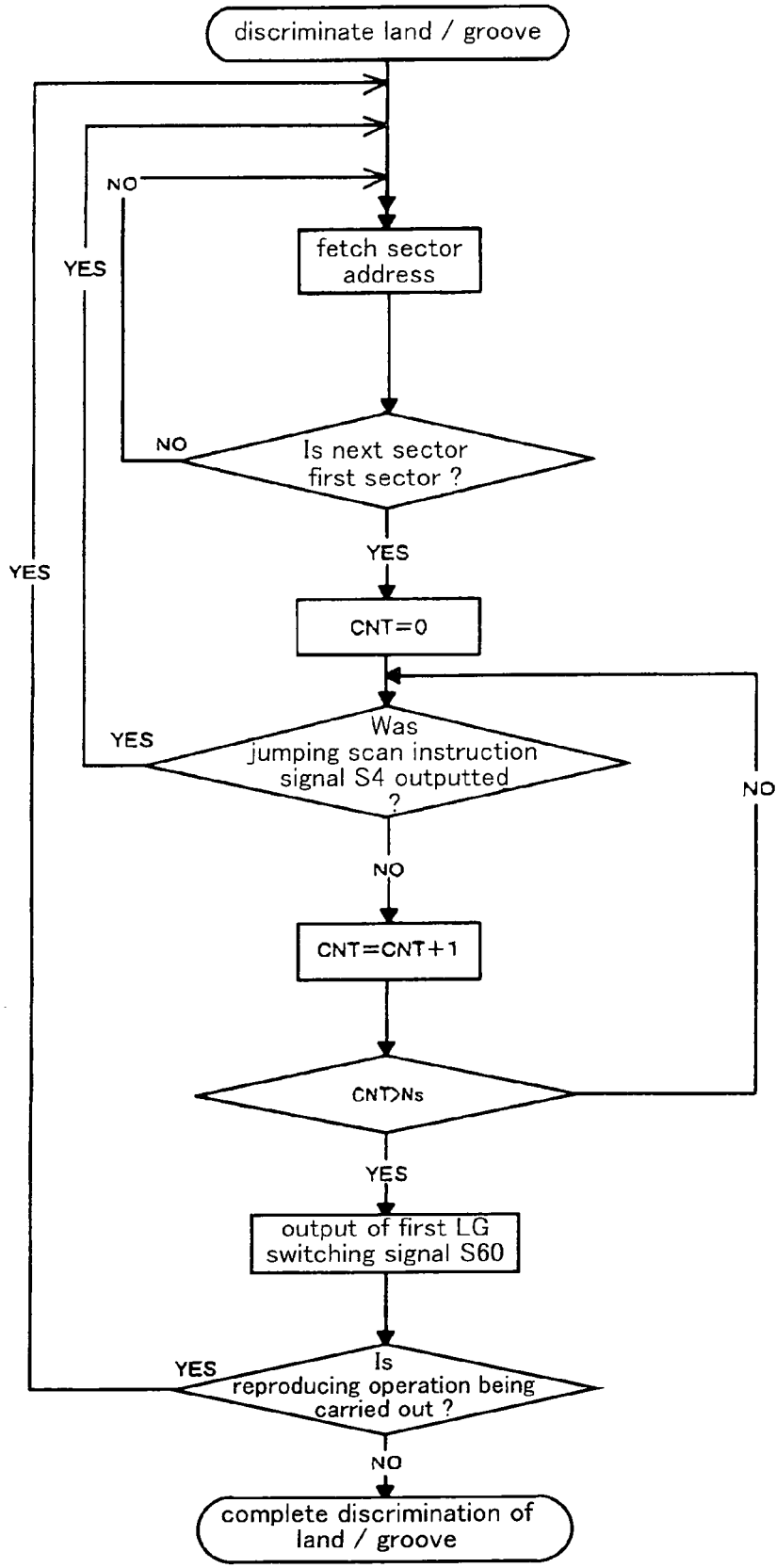
FIG. 18 is a flow chart wherein an operation in FIG. 17 is described.
Figure 20:
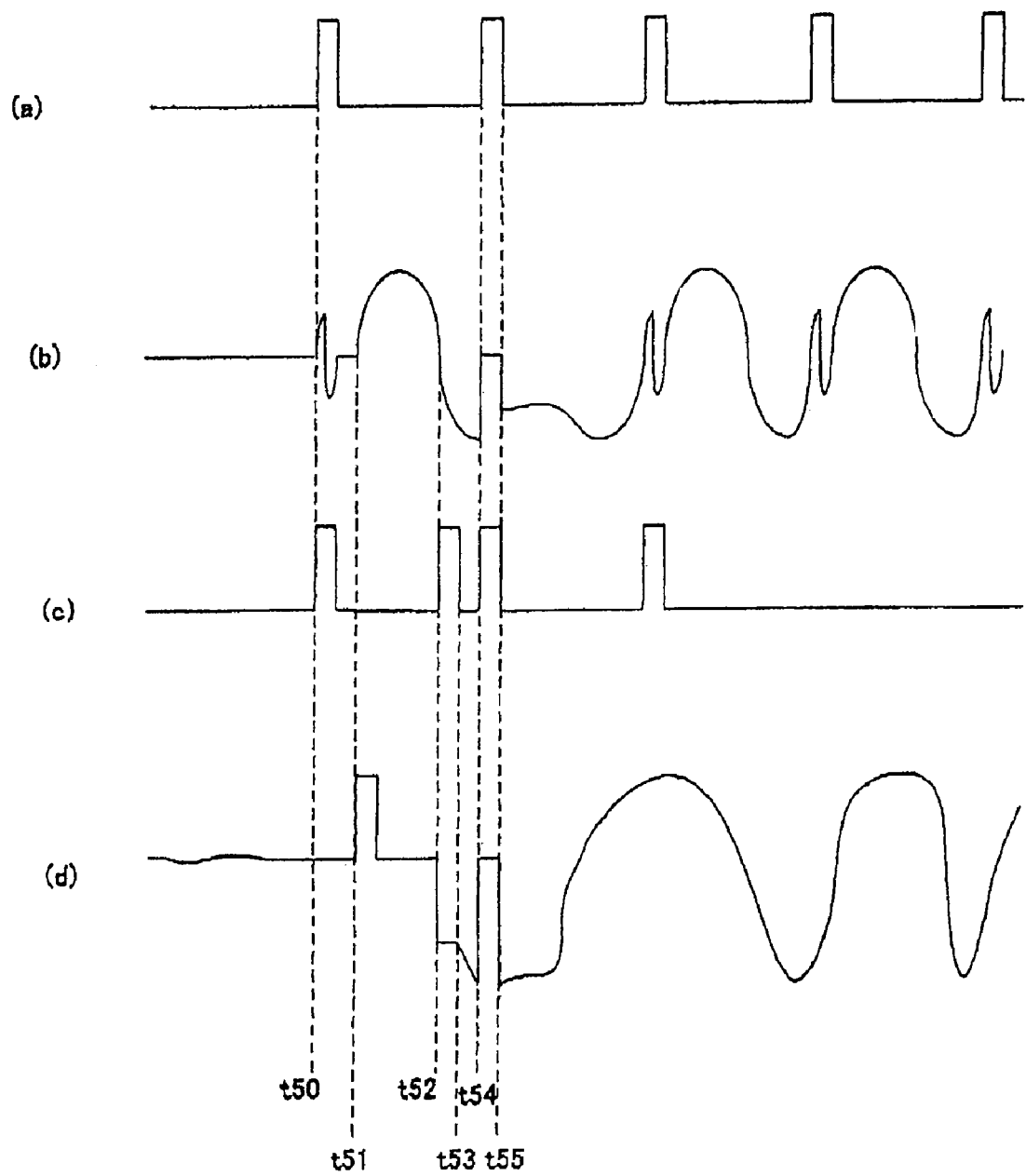
FIG. 20 shows timing charts of signals in a conventional device.

Below is described the operation of the LG discriminating circuit 60 referring to a flow chart shown in FIG. 18. The LG discriminating circuit 60 fetches the sector address from the adding circuit 25. The LG discriminating circuit 60 judges whether or not the sector subsequent to the fetched sector address is the first sector, and resets a count value CNT (CNT=0) of an incorporated counter when the relevant sector is judged to be the first sector. The LG discriminating circuit 60 increments the count value CNT of the incorporated counter (CNT=CNT+1) when the jumping instruction signal S4 is not outputted from the searching circuit 27. Then, the LG discriminating circuit 60 compares a value corresponding to a time length from the time point when the first sector is judged to be the first sector, in other words, the fetched sector is judged to be the last sector until immediately before the header region of the first sector (hereinafter, referred to as Ns value) to the count value CNT. When the counter value CNT is judged to be larger than the other (CNG>Ns), the LG discriminating circuit 60 outputs the first LG switching signal S60 to the jumping scan prohibiting circuit 61 and the OR gate 62. The first LG switching signal s60 is a pulse which switches to and from the land track LT and the groove track GT at the timing by which the optical beam reaches the header region (CAPA) of the first sector.

The track jumping scan has just been executed immediately after the output of the deceleration drive pulse S9. Therefore, the off-track of the optical beam is large when the tracking control is ON which starts immediately after the deceleration drive pulse S9, which may result in the failure to read the address of the header region.

For example, when the tracking control is ON after the track jumping scan is completed immediately before the optical beam reaches the header region, the following conditions are satisfied:

The track jumping scan is executed in the sector before the last sector (before-last sector).

The off-track is large in the header region of the last sector.

In such a case, it is not possible to read the address, and the first LG switching signal S60 is not outputted in the next first sector, as a result of which the optical beam runs to the land track in vicinity.

In the present preferred embodiment, therefore, the jumping scan prohibiting circuit 61 is provided in the output stage of the LG discriminating circuit 60 so that the jumping scan prohibition signal S61 is outputted to the searching circuit 27. Accordingly, the track jumping scan is prohibited during a predetermined time interval immediately before the first sector.

FIG. 19 shows the header signal S30, first LG switching signal 60, jumping scan prohibition period, and jumping scan prohibition signal S61. In FIG. 19, (a)-(d) are timing charts in the case where the header cycle Ta is long, and timing charts on the inner peripheral side of the disc, for example, in a state where the PCAV rotation control is executed. (a')-(d') are timing charts in the case where the header cycle Ta is short, and timing charts on the outer peripheral side of the disc, for example, in the state where the PCAV rotation control is executed. In either of the foregoing cases, the same time length is required for the tracking control to be stable irrespective of the length of the header cycle Ta, and the tracking control prohibition period is thereby the same. The track jumping scan prohibition period corresponds to the predetermined time immediately before the first sector. In FIG. 19, Sn-1, Sn and S0 respectively denote the before-last sector, last sector and first sector. Because the header cycle is different in each zone though the track jumping scan prohibition period is the same, the number of the sectors during the jumping scan prohibition period is changed depending on the header cycle.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A track jumping scan control device wherein a signal based on a reflected light of an optical beam irradiated on an optical disc provided with land tracks and groove tracks formed, alternately in a radial direction of the optical disc, in a header region having an address information and a recording region subsequent to the header region is used to make the optical beam jump-scan a predetermined track, the track jumping scan control device executing, as the track jumping scan:

a full track jumping scan for making the optical beam track-jump between adjacent land tracks or adjacent groove tracks; and a half track jumping scan for making the optical beam track jump from a land track to an adjacent groove track or from a groove track to an adjacent land track, wherein:

the track jumping scan control device is further configured to select which one of the two track jumping scans is executed in accordance with a cycle at which the header region is set, and only the half track jumping scan is selected when the cycle at which the header region is set is below a reference cycle.

2. The track jumping scan control device as claimed in claim 1, wherein the address information is CAPA formed between the land track and the groove track.

3. The track jumping scan control device as claimed in claim 1, wherein the tracking jumping scan control is executed in an optical recording/reproducing apparatus wherein the optical beam is irradiated on the optical disc comprising the header region having the address information between the land track and the groove track alternately radially formed, and a tracking error signal based on a reflected light of the optical beam is used to tracking-control the optical beam so that the information is recorded and reproduced.

4. The track jumping scan control device as claimed in claim 1, wherein the full track jumping scan and the half track jumping scan are mixedly selected when the cycle at which the header region is set is at least a reference cycle.

5. The track jumping scan control device as claimed in claim 1, wherein only the full track jumping scan is selected when number of tracks subjected to the track jumping scan is an even number, and the full track jumping scan and the half track jumping scan are mixedly selected when the number of the tracks subjected to the track jumping scan is an odd number.

6. The track jumping scan control device as claimed in claim 1, wherein the cycle at which the header region is set in an arbitrary zone in the radial direction of the optical disc is calculated based on number of the header regions formed on the track equal to one lap of the arbitrary zone and number of rotations of the optical disc.

7. The track jumping scan control device as claimed in claim 6, wherein in the case where the optical disc is divided into a plurality of radial zones and the number of the header regions formed in one lap of each zone is constant, the number of the header regions formed in one lap of the zone on which the optical beam falls with respect to the optical disc is calculated.

8. The track jumping scan control device as claimed in claim 6, further comprising a mover for moving the optical beam in the radial direction of the optical disc, wherein the zone on which the optical beam falls is calculated based on a position of the mover.

9. The track jumping scan control device as claimed in claim 6, further comprising a rotation control system for controlling a targeted number of rotations of the optical disc, wherein the number of rotations of the optical disc is calculated based on a responsiveness of the rotation control system when the optical beam is moved in the radial direction of the optical disc in the case where the targeted number of the rotations is different at each position in the radial direction of the optical disc.

10. A track searching device comprising:

a convergence unit for converging the optical beam on the optical disc provided with the header region having the address information, and the land tracks and groove tracks adjacent in the radial direction of the disc;

a mover for moving the convergence unit so that the optical beam is shifted to a predetermined track of the optical disc;

a tracking error detector for generating a tracking error signal based on a reflected light from the optical disc;

a tracking controller for tracking-controlling the mover so that the optical beam shifts to the predetermined track in accordance with the tracking error signal; and the track jumping scan control device as claimed in claim 1.

* * * * *